(12) United States Patent
Yano et al.

(10) Patent No.: US 7,978,234 B2
(45) Date of Patent: Jul. 12, 2011

(54) IMAGE ACQUISITION APPARATUS, RESOLUTION ENHANCING METHOD, AND RECORDING MEDIUM

(75) Inventors: Takahiro Yano, Hachioji (JP); Nobuyuki Watanabe, Yokohama (JP)

(73) Assignee: Olympus Corporation, Tokyo (JP)

( * ) Notice: Subject to any disclaimer, the term of this patent is extended or adjusted under 35 U.S.C. 154(b) by 308 days.

(21) Appl. No.: 12/202,703

(22) Filed: Sep. 2, 2008

(65) Prior Publication Data
US 2009/0002504 A1  Jan. 1, 2009

Related U.S. Application Data

(63) Continuation of application No. PCT/JP2007/053795, filed on Feb. 28, 2007.

(30) Foreign Application Priority Data

Mar. 3, 2006 (JP) ................................. 2006-057800

(51) Int. Cl.
*H04N 5/228* (2006.01)
(52) U.S. Cl. ..................................... 348/239; 348/222.1
(58) Field of Classification Search ............... 348/222.1, 348/239
See application file for complete search history.

(56) References Cited

U.S. PATENT DOCUMENTS

| | | | |
|---|---|---|---|
| 2010/0033602 A1* | 2/2010 | Okada et al. | 348/241 |
| 2010/0091131 A1* | 4/2010 | Furukawa | 348/222.1 |

FOREIGN PATENT DOCUMENTS

| | | |
|---|---|---|
| JP | 10-69537 A | 3/1998 |
| JP | 2004-40422 A | 2/2004 |
| JP | 2005-284635 A | 10/2005 |

OTHER PUBLICATIONS

International Preliminary Report on Patentability, Chapter I of the Patent Cooperation Treaty,and Written Opinion for PCT/JP2007/053795 dated Sep. 18, 2008. 5 sheets.

* cited by examiner

*Primary Examiner* — Tuan Ho
(74) *Attorney, Agent, or Firm* — Holtz, Holtz, Goodman & Chick, PC

(57) ABSTRACT

An image sensor acquires images with resolutions being switched. A resolution switching unit switches the resolutions of the images to be output from the image sensor. An image selecting unit selects a basic image from a plurality of output images which are output from the image sensor, having different resolutions of two or more types switched by the resolution switching unit, at least including an image having a first resolution and an image having a second resolution higher than the first resolution. An image displacement estimating unit estimates a displacement between the basic image and another image. A resolution converting unit converts the resolution of any image in the plurality of output images output from the image sensor using the image having the first resolution and the image having the second resolution acquired by the image sensor and the displacement between images obtained by the image displacement estimating unit.

22 Claims, 12 Drawing Sheets

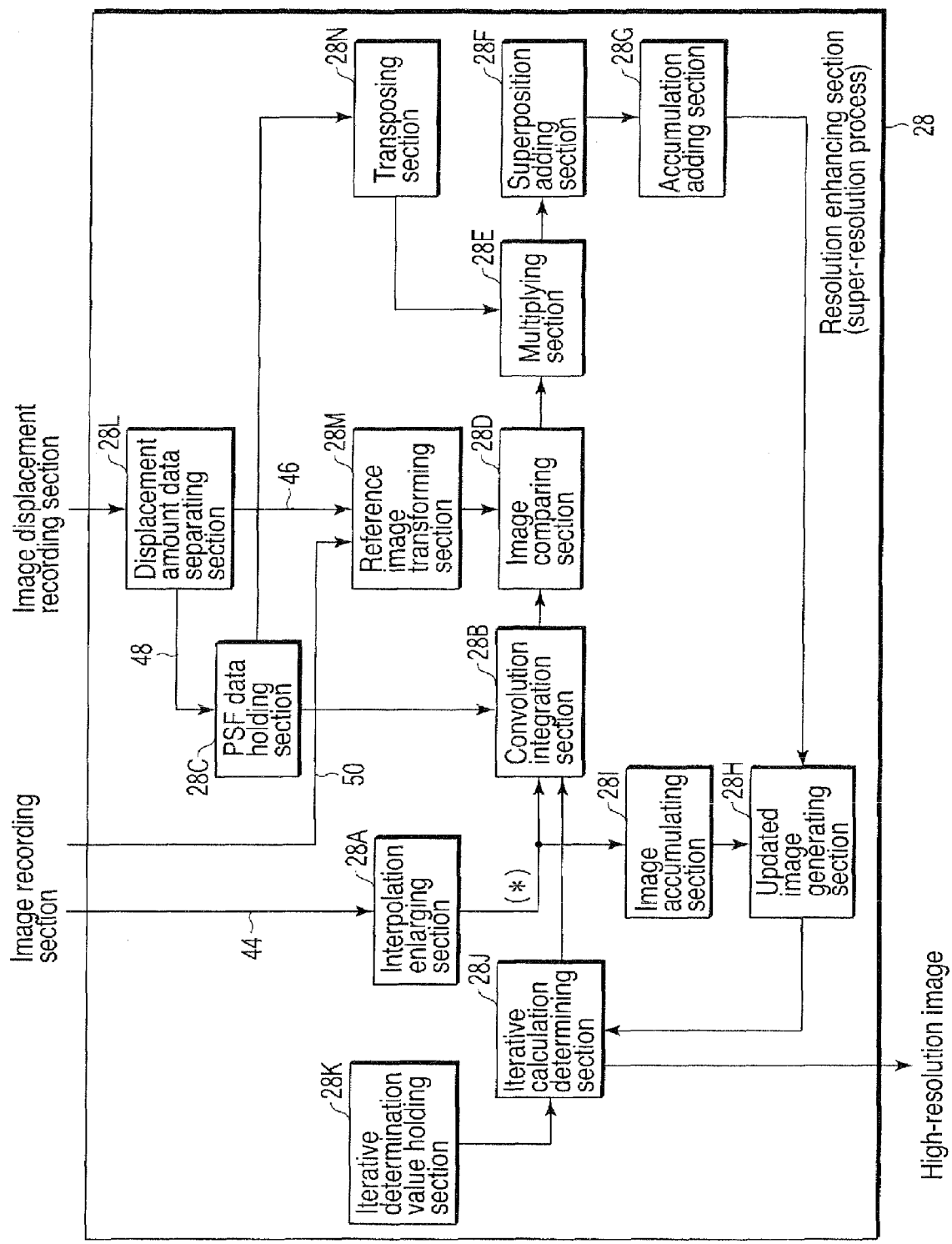
F I G. 8

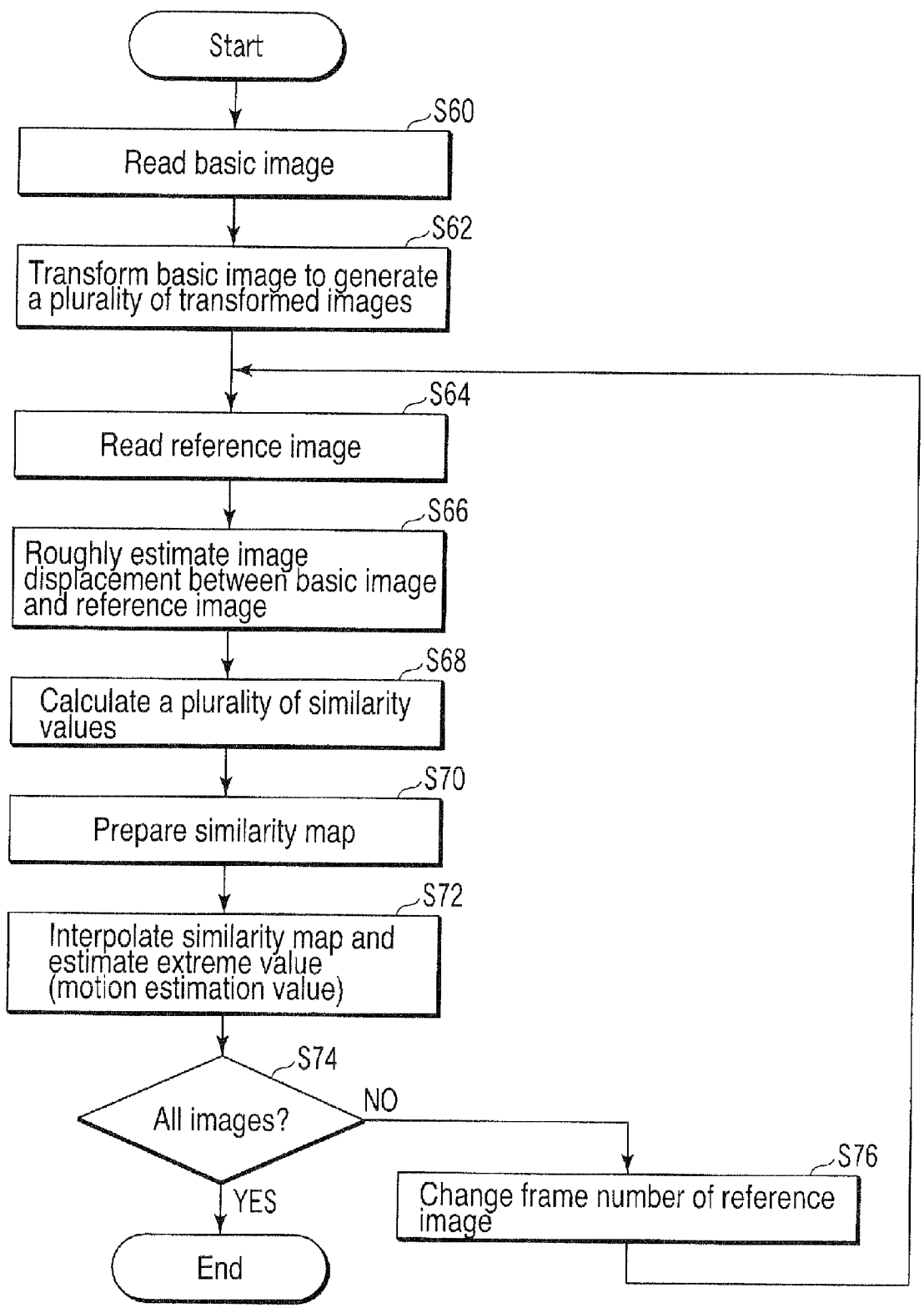
F I G. 13

IMAGE ACQUISITION APPARATUS, RESOLUTION ENHANCING METHOD, AND RECORDING MEDIUM

CROSS REFERENCE TO RELATED APPLICATIONS

This is a Continuation Application of PCT Application No. PCT/JP2007/053795, filed Feb. 28, 2007, which was published under PCT Article 21(2) in Japanese.

This application is based upon and claims the benefit of priority from prior Japanese Patent Application No. 2006-057800, filed Mar. 3, 2006, the entire contents of which are incorporated herein by reference.

BACKGROUND OF THE INVENTION

1. Field of the Invention

The present invention relates to an image acquisition apparatus and a resolution enhancing method which generate high-resolution images at a high frame rate using an image sensor which can read at different resolutions. Further, the invention relates to a computer readable recording medium which stores a program including a command for allowing a computer to execute the resolution enhancing method.

2. Description of the Related Art

Due to the development of semiconductor techniques in recent years, the number of pixels of image sensors tends to be increased. Although the devices are miniaturized and sped up, a lot of time is required for reading data from an image sensor whose number of pixels is increased. When the number of pixels is increased in one area, since the size of one pixel with respect to the size of the image sensor becomes small, for example, an S/N ratio is deteriorated. For this reason, in an image sensor with a larger number of pixels, it is difficult to shoot moving images at a high frame rate.

On the other hand, apparatuses for taking both still images and moving images are commercialized in recent years. In such an apparatus, a high-resolution image sensor is used, and still images are shot with a high resolution. On the other hand, in shooting moving images, a data reading mode called a draft mode is used, since moving images should be shot at an increased frame rate. For example, a reading method where thinning-out reading for reading four of eight vertical pixels for two clocks in CCD and skipping the rest is combined with plural field reading, or a method for adding pixels in horizontal and vertical directions, as in an MOS image sensor is used. In such a manner, one image sensor is shared in shooting both still images and moving images. Examples of actual products are image acquisition apparatuses such as digital cameras and digital video cameras which can shoot still images during shooting of moving images. These image acquisition apparatuses can shoot still images using an interruption signal by pressing a shutter button during the shooting of moving images.

In these image acquisition apparatuses, low-resolution images read for moving images are obtained as an image string with a high frame rate. However, since a pixel mixing technique or the like as described above is used, the resolving power of the image sensor cannot be exerted. For this reason, even when the moving images obtained by the shooting of the moving images include an image which is desired to be recorded as a high-resolution still image or an image which is desired to be printed finely, namely, a so-called right-moment scene image, such scene image with a high resolution cannot be obtained. Needless to say, when the shutter button is pressed during the shooting of moving images, a high-resolution still image can be acquired at that moment. However, in shooting before and after the moment of the shutter pressing, as in high-speed continuous shooting and pre-capturing, low-resolution images at the time of shooting moving images are shot. In another technique, means for enhancing resolution by applying an interpolating process or the like to the low-resolution images is used, but high-resolution images of high quality cannot be acquired by the interpolating process or the like.

Therefore, it is desired that any image during the shooting of moving images is read as a still image whose resolution is enhanced to high quality.

Various methods for generating high-resolution images using image data with less pixels are proposed in using image acquisition apparatuses such as video cameras. In order to solve the above problems of (1) high-resolution high-speed shooting and (2) enhancement of moving image resolution, as one example, Jpn. Pat. Appln. KOKAI Publication No. 10-69537 discloses a method for generating a high-resolution image using a plurality of low-resolution images with displacement. In this resolution enhancing process, a plurality of images with displacement at a sub-pixel level are shot with uniform resolution, deterioration factors of the images are eliminated and the images are synthesized so that one high-definition image is formed.

Jpn. Pat. Appln. KOKAI Publication No. 2004-40422 discloses a system for shooting a plurality of low-resolution images and high-resolution images whose sampling rate is lower than the low-resolution images, so as to generate a high-resolution image from the two kinds of image data, using a data compressing technique adopting two kinds of resolutions. In this system, when a plurality of low-resolution images and high-resolution images are shot and a high-resolution image is generated using these images, displacement correspondences among the low-resolution images are obtained. These are obtained in the following manner. The displacements between adjacent frames in a plurality of low-resolution images are obtained as local corresponding Information. Thereafter, the plurality of pieces of local corresponding information are integrated at an interval of a key frame, so that global corresponding information is generated as displacement between the key frames selected from the low-resolution images.

BRIEF SUMMARY OF THE INVENTION

According to a first aspect of the present invention, there is provided an image acquisition apparatus which electronically records an image of a subject, comprising:

an image sensor configured to shoot images with the resolutions of the images being switched;

a resolution switching unit configured to switch the resolutions of the images to be output from the image sensor;

an image selecting unit configured to select a basic image from a plurality of output images which are output from the image sensor, having different resolutions of two or more types switched by the resolution switching unit, at least including an image having a first resolution and an image having a second resolution higher than the first resolution;

an image displacement estimating unit configured to estimate a displacement between the basic image and another image; and a resolution converting unit configured to convert the resolution of any image in the plurality of output images output from the image sensor using the image having the first resolution and the image having the second resolution shot by the image sensor and the displacement between images obtained by the image displacement estimating unit.

According to a second aspect of the present invention, there is provided an image acquisition apparatus which electronically records an image of a subject, comprising:

an image sensor configured to shoot images with the resolutions of the images being switched;

a resolution switching unit configured to switch the resolutions of the images to be output from the image sensor;

an image selecting unit configured to select one of images having a first resolution as a basic image from a plurality of output images which are output from the image sensor, having different resolutions of two or more types switched by the resolution switching unit, at least including images having the first resolution and an image having a second resolution higher than the first resolution;

a first displacement estimating unit configured to estimate a displacement between the basic image and another image having the first resolution;

a high-resolution image estimating unit configured to estimate an image having a third resolution higher than the first resolution using a calculated result in the first displacement estimating unit;

a second displacement estimating unit configured to estimate a displacement between the image having the third resolution obtained by the high-resolution image estimating unit and the image having the second resolution; and a resolution converting unit configured to convert a resolution of the image having the third resolution using the displacement between images obtained by the second displacement estimating unit.

According to a third aspect of the present invention, there is provided a resolution enhancing method for enhancing a resolution of any image in a plurality of output images output from an image sensor in an image acquisition apparatus which acquires a plurality of images with at least two types of different resolutions from the image sensor which can shoot output images with resolutions being switched, the method comprising:

acquiring a plurality of output images with at least two types of different resolutions at least including an image having a first resolution and an image having a second resolution higher than the first resolution from the image sensor;

selecting a basic image from the plurality of output images with two or more types of different resolutions acquired from the image sensor;

estimating a displacement between the basic image and another image; and converting a resolution of any image in the plurality of output images output from the image sensor using the image having the first resolution and the image having the second resolution output from the image sensor and the estimated image displacement.

According to a fourth aspect of the present invention, there is provided a resolution enhancing method for enhancing a resolution of any image in a plurality of output images output from an image sensor in an image acquisition apparatus which acquires a plurality of images with at least two types of different resolutions from the image sensor which can shoot output images with resolutions being switched, the method comprising:

acquiring a plurality of output images with at least two types of different resolutions at least including an image having a first resolution and an image having a second resolution higher than the first resolution from the image sensor;

selecting one of the images having the first resolution as a basic image from the plurality of output images with two or more types of different resolutions acquired from the image sensor;

estimating a displacement between the basic image and another image having the first resolution;

estimating an image having a third resolution higher than the first resolution using the displacement between the basic image and another image having the first resolution;

estimating a displacement between the image having the second resolution and the image having the third resolution; and converting a resolution of the image having the third resolution using the image having the second resolution and the displacement between the image having the second resolution and the image having the third resolution.

According to a fifth aspect of the present invention, there is provided a resolution enhancing method for enhancing a resolution of any image in a plurality of output images output from an image sensor in an image acquisition apparatus which acquires a plurality of output images with at least two types of different resolutions from the image sensor which can shoot output images with resolutions being switched, the method comprising:

acquiring an image having a first resolution from the image sensor;

generating an interruption signal;

switching the resolutions of the output images output from the image sensor according to the generated interruption signal;

acquiring images each having a resolution higher than the first resolution from the image sensor correspondingly to the switching;

selecting a basic image from the acquired images having a resolution higher than the first resolution;

estimating a displacement between the basic image and another image having the first resolution; and converting a resolution of any image in the plurality of output images using the plurality of output images output from the image sensor and the displacement between the basic image and another image having the first resolution.

According to a sixth aspect of the present invention, there is provided a computer readable recording medium which stores a resolution enhancing program for generating a high-resolution image of any image in a plurality of output images having at least two types of different resolutions acquired by an image sensor which can shoot output images with resolutions being switched, the resolution enhancing program including a command for allowing a computer to execute:

selecting a basic image from the plurality of output images having two or more types of different resolutions at least including an image having a first resolution and an image having a second resolution higher than the first resolution;

estimating a displacement between the basic image and another image; and converting a resolution of any image in the plurality of output images using the image having the second resolution and the estimated displacement between images.

According to a seventh aspect of the present invention, there is provided a computer readable recording medium which stores a resolution enhancing program for generating a high-resolution image of any image in a plurality of output images having at least two types of different resolutions acquired by an image sensor which can shoot output images with resolutions being switched, the resolution enhancing program including a command for allowing a computer to execute:

selecting one of images having a first resolution as a basic image from a plurality of images having two or more types of different resolutions at least including images having the first resolution and an image having a second resolution higher than the first resolution;

estimating a displacement between the basic image and another image having the first resolution;

estimating an image having a third resolution higher than the first resolution using the displacement between the basic image and another image having the first resolution;

estimating a displacement between the image having the second resolution and the image having the third resolution; and converting a resolution of the image having the third resolution using the image having the second resolution and the displacement between the image having the second resolution and the image having the third resolution.

According to an eighth aspect of the present invention, there is provided a computer readable recording medium which stores a resolution enhancing program for generating a high-resolution image of any image in a plurality of output images having at least two types of different resolutions acquired by an image sensor which can shoot output images with resolutions being switched, the resolution enhancing program including a command for allowing a computer to execute:

acquiring an image having a first resolution from the image sensor;

generating an interruption signal;

switching the resolutions of the output images output from the image sensor according to the generated interruption signal;

acquiring an image having a resolution higher than the first resolution from the image sensor correspondingly to the switching;

selecting a basic image from the acquired images having a resolution higher than the first resolution;

estimating a displacement between the basic image and another image having the first resolution; and converting a resolution of any image in the plurality of output images acquired from the image sensor using the plurality of output images output from the image sensor and the displacement between the basic image and another image having the first resolution.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is a block diagram illustrating a configuration of a super-resolution process as an example of a configuration of a resolution enhancing section;

FIG. 13 is a flow chart illustrating a flow of an image displacement estimating process in a low-resolution space image displacement estimating section;

DETAILED DESCRIPTION OF THE INVENTION

Embodiments of the present invention will be described below with reference to the drawings.

Figure 1:
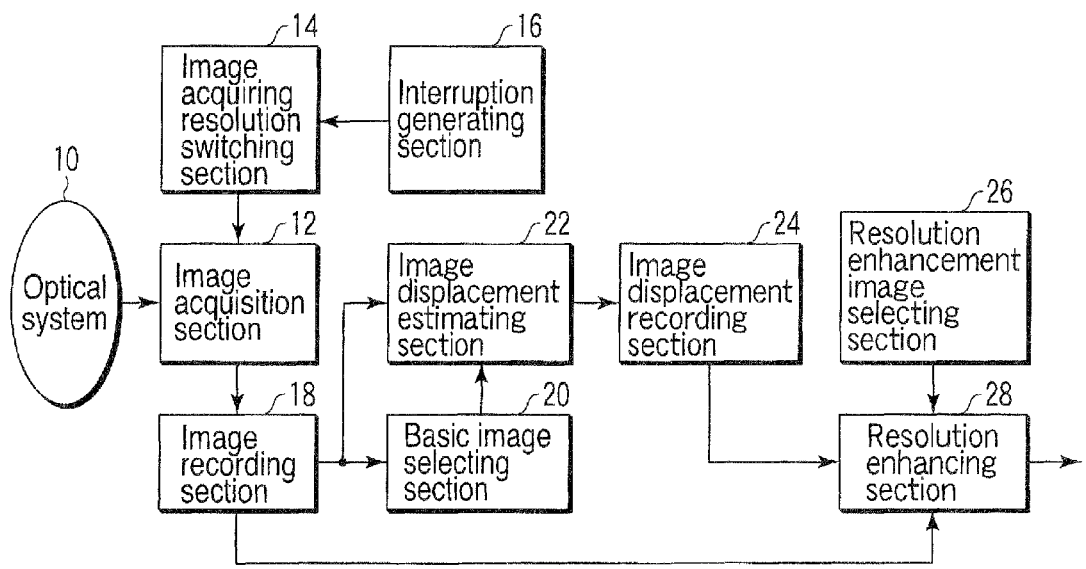
FIG. 1 is a block diagram illustrating a configuration of an image acquisition apparatus according to a first embodiment of the present invention.

An image acquisition apparatus according to a first embodiment includes, as shown in FIG. 1, an optical system 10, an image acquisition section 12, an image acquiring resolution switching section 14, an interruption generating section 16, an image recording section 18, a basic image selecting section 20, an image displacement estimating section 22, an image displacement recording section 24, a resolution enhancement image selecting section 26, and a resolution enhancing section 28.

The image acquisition section 12 photoelectrically converts an optical object image formed through the optical system 10 so as to output electric image data. The image acquisition section 12 is an image sensor which can switch the resolutions of output images. The image acquisition section 12 has a switching function that enables selection of a reading system from among a plurality of reading systems, such as a progressive reading system, an interleave reading system, a pixel thinned-out reading system and a pixel mixed reading system, suitably adopted according to an application and/or a function of the image acquisition apparatus according to a shooting scene, mode and the like. The progressive reading system is a system which sequentially reads all pixel signals when signals of the respective pixels are read. The interleave reading system is a system which reads signals of pixels alternatively in odd-number lines and even-number lines. The image thinned-out reading system is a system which skips specified pixels in horizontal and vertical directions when reading signals of pixels. The pixel-mixed reading system is a system which mixes specified pixels so as to read the mixed pixels as one pixel signal. The image acquisition section 12 may obviously have a function which selectively reads a pixel signal in a desired partial area with a reading range being variable.

The image acquiring resolution switching section 14 switches the resolutions of output images from the image acquisition section 12. That is, the image acquiring resolution switching section 14 functions as a resolution switching unit configured to switch the resolutions of images output from the image sensor. The interruption generating section 16 generates an interruption for switching the image acquiring resolutions in the image acquiring resolution switching section 14.

The image recording section 18 electronically records image data output from the image acquisition section 12.

The basic image selecting section 20 selects a basic image from a plurality of images recorded in the image recording section 18. That is, the basic image recording section 20 functions as an image selecting unit configured to select a basic image.

The image displacement estimating section 22 estimates image displacements based on the images recorded in the image recording section 18 and the basic image selected by the basic image selecting section 20. That is, the image displacement estimating section 22 functions as an image displacement estimating unit configured to estimate the displacements between the basic image and another images.

The image displacement recording section 24 records the image displacements estimated by the image displacement estimating section 22.

The resolution enhancement image selecting section 26 selects a target image whose resolution is to be enhanced.

The resolution enhancing section 28 enhances the resolution of an image from the image recording section 18 selected by the resolution enhancement image selecting section 26 using the image displacement information from the image displacement recording section 24. That is, the resolution enhancing section 28 functions as a resolution converting unit configured to convert the resolution.

Though not shown in FIG. 1, the image acquisition apparatus has an operation control section, such as a computer, a processor and the like, which controls operations of the respective sections. The computer, the processor and the like may execute some or many of the processes in the respective sections.

A flow of data is described below with reference to FIG. 1.

An object image formed by the optical system 10 is spatially discretized and sampled by the image acquisition section 12 so as to be converted into image data. The image data is supplied to the image recording section 18, and is electronically recorded in the image recording section 18. At this time, the resolution of an image output from the image acquisition section 12 is determined according to instruction information about reading the resolution from the image acquiring resolution switching section 14. That is, when the image acquiring resolution switching section 14 is switched into a high-resolution mode, the image acquisition section 12 outputs a high-resolution image. When the image acquiring resolution switching section 14 is switched into a low-resolution mode, the image acquisition section 12 continuously outputs low-resolution images of a lower resolution but higher frame rate than the high-resolution image. When an interruption is generated by the interruption generating section 16, the image acquiring resolution switching section 14 switches the resolution mode.

The acquisition image selecting section 20 selects a basic image to be a basis for image displacement estimation from the high-resolution images and the low-resolution images recorded in the image recording section 18. The image displacement estimating section 22 estimates displacements between images. The image displacements estimated by the image displacement estimating section 22 are recorded in the image displacement recording section 24. The resolution enhancing section 28 generates a high-resolution image using the image displacement information recorded in the image displacement recording section 24, the high-resolution images and the low-resolution images recorded in the image recording section 18, and the resolution enhancement image selection information representing a target image which is specified by the resolution enhancement image selecting section 26 as an image whose resolution is to be enhanced.

Figure 2:
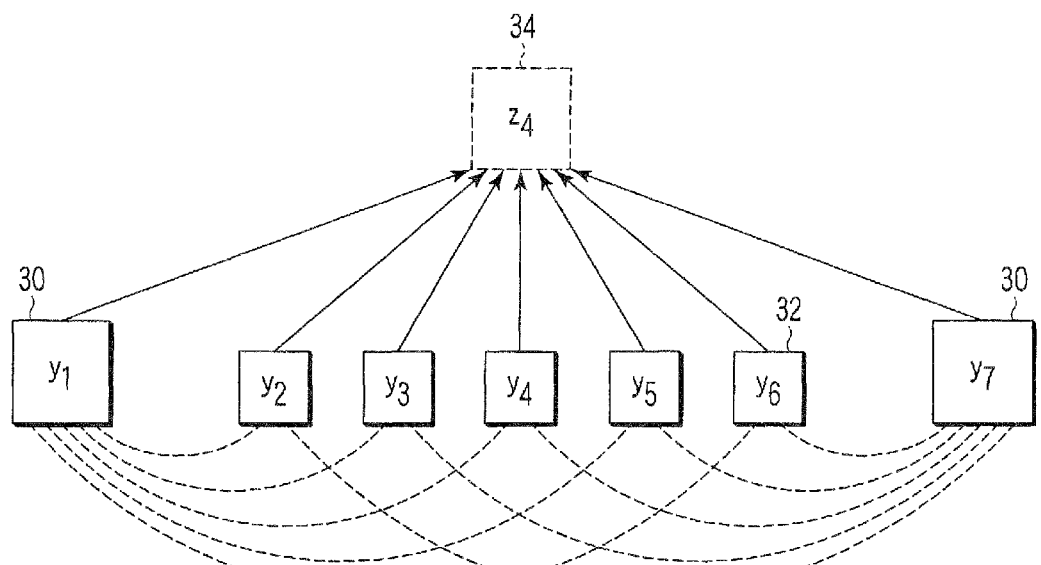
FIG. 2 is a conceptual diagram illustrating a super-resolution process using estimation of a motion between images.

The respective components in FIG. 1 are described below with reference to FIG. 2 which is a conceptual diagram of the first embodiment.

The concept of this embodiment is described with reference to FIG. 2. High-resolution images 30 ($y_1$, $y_7$) obtained by shooting at different times and low-resolution images 32 ($y_2$, $y_3$, $y_4$, $y_5$, $y_6$) between the high-resolution images are recorded in the image recording section 18. The high-resolution image generating process is executed by using all the images 30 and 32. That is, as shown by dotted lines in FIG. 2, displacements (motions) between each of the high-resolution images 30 ($y_1$, $y_7$) and the low-resolution images 32 ($y_2$, $y_3$, $y_4$, $y_5$, $y_6$) is estimated, and further a high-resolution image 34 is estimated based on the estimated motions and shooting system function (band limitation due to optical blurring and sampling by imager) by a super-resolution process as shown by solid-line arrows in FIG. 2. In the example of FIG. 2, the low-resolution image 32 ($y_4$) is selected as a target image whose resolution is to be enhanced, and the estimated high-resolution image 34 ($z_4$) becomes a high-resolution image corresponding to the timing of the low-resolution image 32 ($y_4$). When the resolution of the high-resolution image 34 ($z_4$) is the same as that of the high-resolution images 30 ($y_1$, $y_7$), only displacement amounts between the low-resolution image 32 and the high-resolution images 30 may be estimated. When the resolution of the high-resolution image 34 ($z_4$) is not less than that of the high-resolution images 30 ($y_1$, $y_7$), the calculation for estimating the resolution enhancement is necessary. Hereinafter, an image to be the basis for the displacement estimation is called as a basic image, and the other images are called as reference images.

The operation of the image acquisition apparatus according to the first embodiment is described below along the flow of the shooting using the interrupting operation.

Figure 3:
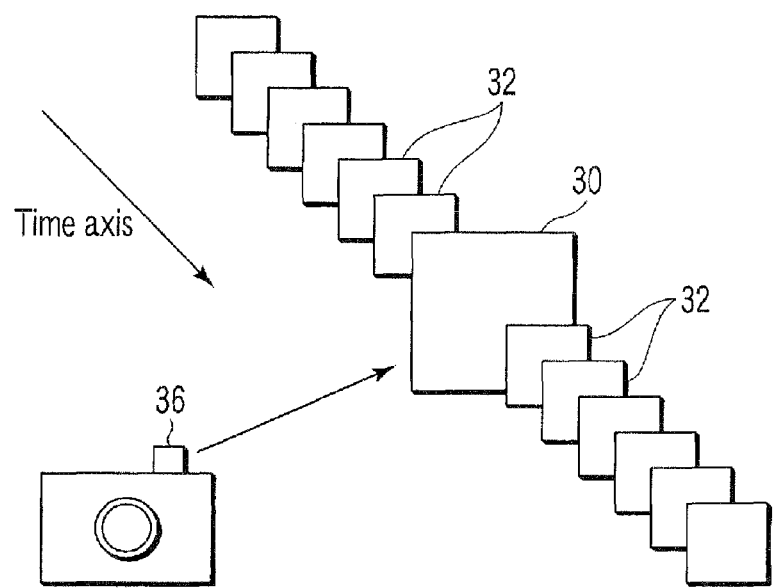
FIG. 3 is a conceptual diagram illustrating a first example of an interrupting operation during shooting.

In a first example of the interrupting operation, as shown in FIG. 3, the image acquiring resolution switching section 14 is set to the low-resolution mode in a normal state so that, when shooting images, low-resolution images 32 are continuously output from the image acquisition section 12 according to the continuous shooting. During the continuous shooting, when the interruption generating section 16 generates an interruption according to a user operation of pressing a switch 36, or the like, the image acquiring resolution switching section 14 is switched into the high-resolution mode so as to allow the image acquisition section 12 to output a high-resolution image 30. Thereafter, the image acquiring resolution switching section 14 is again switched into the low-resolution mode, so as to allow the image acquisition section 12 to continuously output low-resolution images 32.

Figure 4:
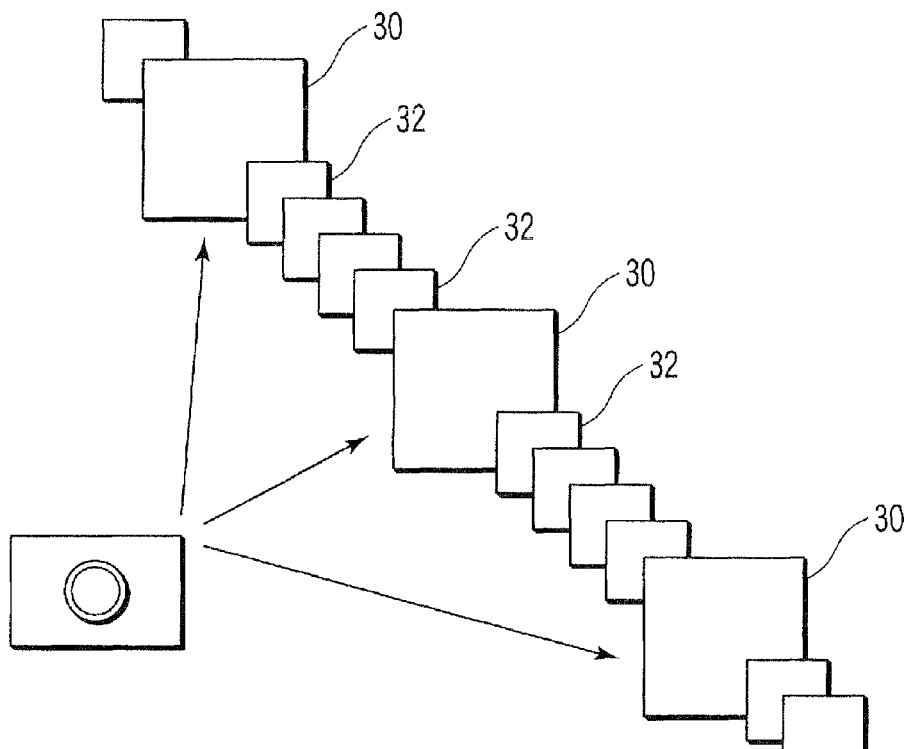
FIG. 4 is a conceptual diagram illustrating a second example of the interrupting operation during shooting.

In a second example of the interrupting operation, as shown in FIG. 4, the image acquiring resolution switching section 14 is switched into the low-resolution mode at the time of shooting so as to allow the image acquisition section 12 to continuously output low-resolution image 32, and during this continuous output, the interruption generating section 16 generates an interruption iteratively. When this iterative interruption is generated, the image acquiring resolution switching section 14 is switched into the high-resolution mode so as to allow the image acquisition section 12 to output a high-resolution image 30. That is, a high-resolution image 30 is acquired in a constant cycle.

Like the first or second example, the low-resolution images 32 and the high-resolution images 30 obtained by shooting in the image acquisition section 12 are recorded in the image recording section 18.

The basic image selecting section 20 selects one of the high-resolution images 30 saved in the image recording section 18 as a basic image for estimating the image displacement. The image displacement estimating section 22 obtains displacement positions between the basic image selected in the basic image selecting section 20 and shot images other than the intended basic image so as to record this obtained result into the image displacement recording section 24.

Details of the algorithm of the image displacement estimation are described below along the flow of the algorithm shown in a flow chart of FIG. 5.

One high-resolution image 30 to be the basis for the image displacement estimation is read as a basic image (step S10).

The read basic image is transformed by a plurality of image displacements so that an image string is generated (step S12).

Further, one low-resolution image 32 subject to the image displacement estimation with respect to the basic image is read as a reference image (step S14).

Thereafter, a determination is made as to whether the read reference image includes a lot of aliasing (step S16).

As a result, when the aliasing amount is small, the resolution of the reference image is made to be equal to the resolution of the basic image by an interpolating process (step S18). On the contrary, when the aliasing amount is large, the resolution of the image string acquired by transforming the basic image to obtain a plurality of transformed images is made to be equal to the resolution of the reference image (step S20).

The image displacement between the reference image and the basic image is roughly estimated by a process such as area base matching, and the reference image is transformed based on the estimated result so that the reference image is roughly matched with the basic image (step S22). One example of the rough image displacement estimation is a process such as pixel-based area-base-matching. Accurate image locating is carried out at step S28 described below. Therefore, another method may be used as long as this method is an image displacement estimating process whose accuracy is lower than the image displacement estimating process executed at step S28 and with which images can be generally located.

Similarity values between the image string, which is acquired by transforming the basic image using image displacement parameters (transformation motion parameters) to obtain a plurality of transformed images at step S12, and the reference image, which is generally matched with the basic image at step S22, are calculated (step S24).

A discrete similarity map is prepared by using relationships between the image displacement parameters (transformation motion parameters) and the calculated similarity values (step S26).

Figure 6:
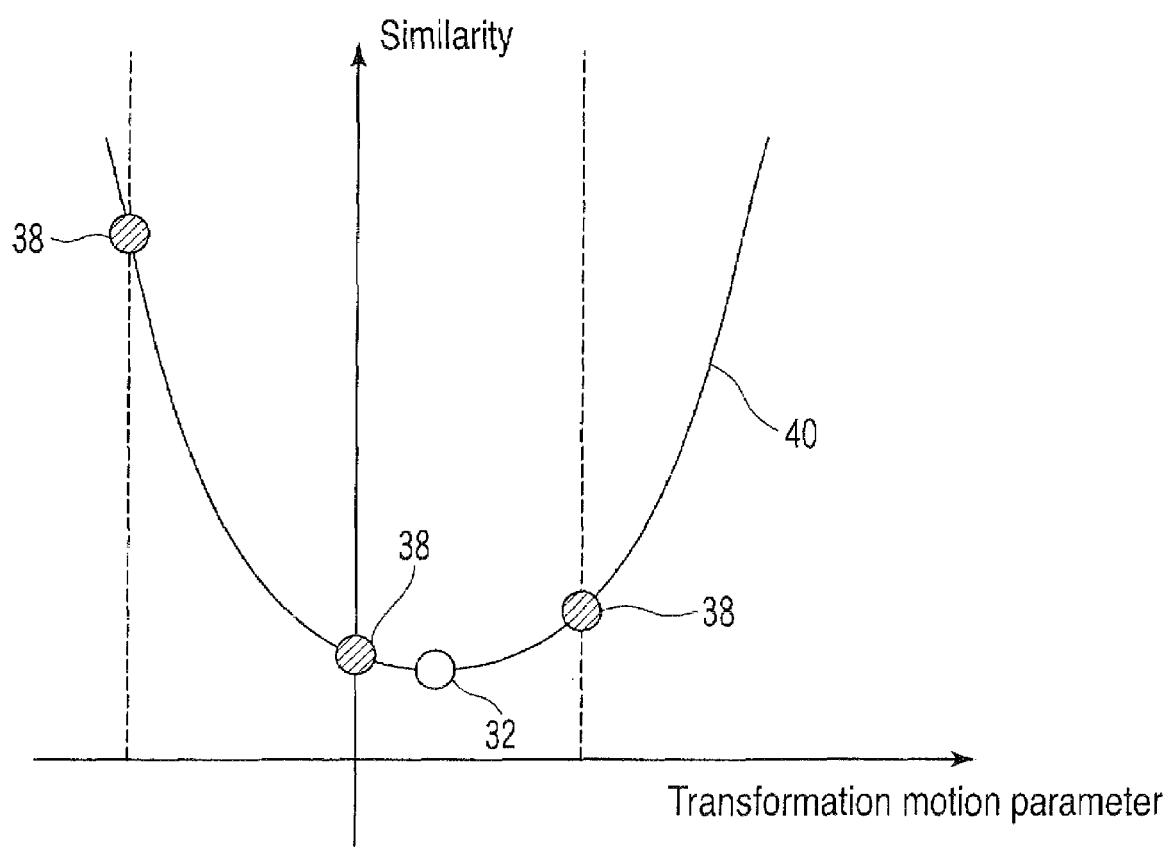
FIG. 6 is a conceptual diagram illustrating a method for searching for an extreme value of a similarity map by parabola fitting.

An extreme value of the continuous similarity values obtained by interpolating the discrete similarity map prepared at step S26 is searched for and obtained (step S28). The image displacement represented by the image displacement parameter at the extreme value is the image displacement to be obtained (image displacement estimation value). Methods for searching for the extreme value of the similarity map include a parabola fitting method, a spline interpolation method, and the like. FIG. 6 illustrates an example where the image displacement is estimated by parabola fitting. The ordinate axis represents the similarity, and the smaller the value, the higher the similarity. As shown in FIG. 6, the interpolation is made between discrete similarity values 38 by parabola fitting so that a continuous similarity curve 40 is obtained, and the extreme value 42 thereof can be searched for. The obtained image displacement estimation value is recorded in the image displacement recording section 24.

Thereafter, a determination is made as to whether the image displacement estimation is made on all the intended reference images (step S30). When the image displacement estimation is not made on all the intended reference images, the frame number of the reference image is changed (step S32), and the process returns to step S14, so that the process for reading a next reference image is executed continuously. On the contrary, when the image displacement estimation has been made on all the intended reference images, the process is ended.

The resolution enhancing section 28 executes the image resolution enhancing process on a resolution enhancement target image based on the image displacement estimation value recorded in the image displacement recording section 24, selection information about an image which is selected by the resolution enhancement image selecting section 26 as an image whose resolution is to be enhanced (hereinafter, a resolution enhancement target image), and the high-resolution images 30 and the low-resolution images 32 recorded in the image recording section 18.

Figure 7:
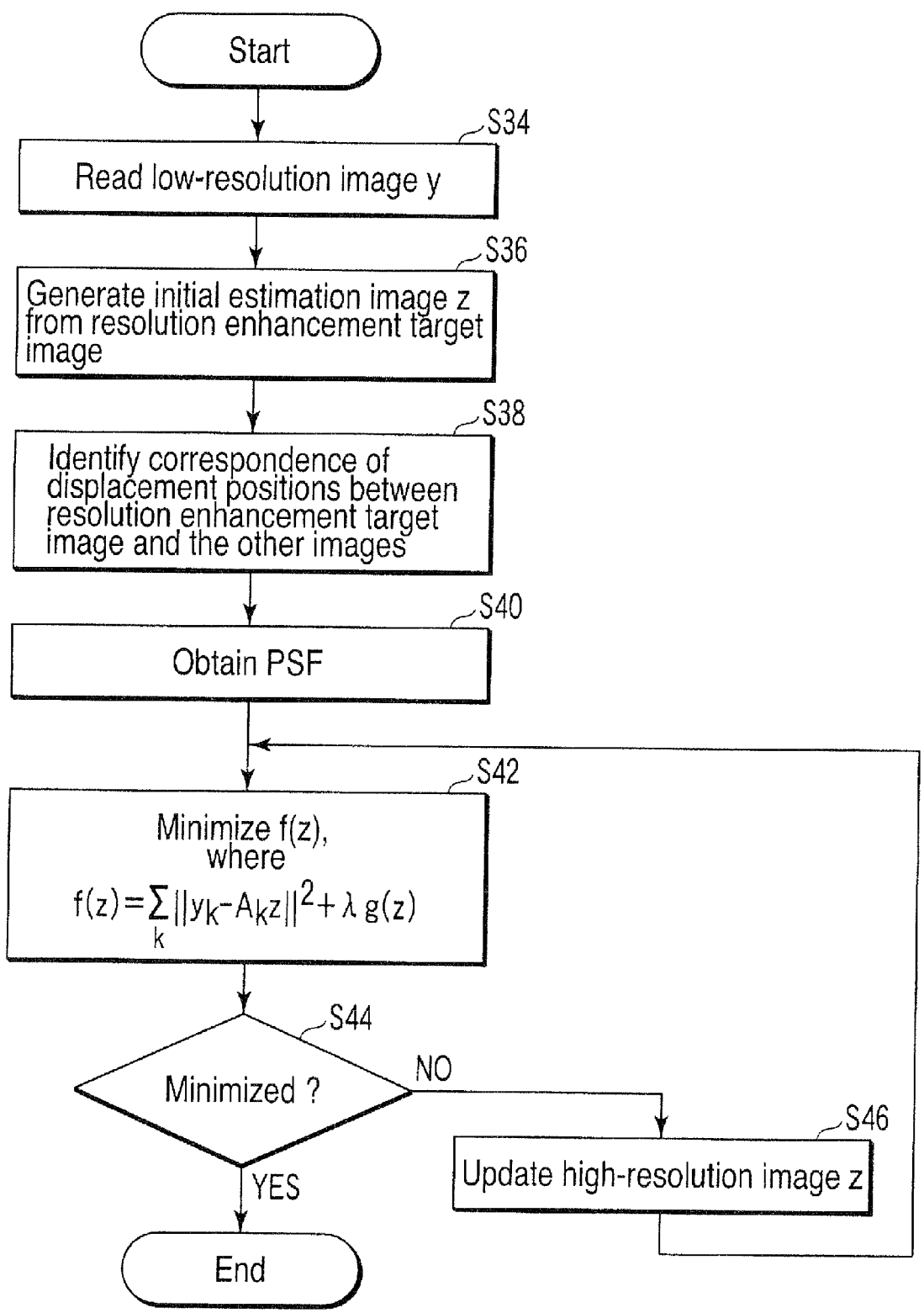
FIG. 7 is a flow chart illustrating a flow of an image resolution converting process in the first embodiment.

An example of the image resolution enhancing process is described with reference to a flow chart of FIG. 7 illustrating a flow of the algorithm.

The plurality of low-resolution images 32 and high-resolution images 30 shot by the image acquisition section 12 are read so as to be used for estimating the high-resolution image (step S34).

The low-resolution image 32 selected from the images recorded in the image recording section 18 by the resolution enhancement image selecting section 26 is used as the resolution enhancement target image. The interpolating process is executed on the resolution enhancement target image so that the initial high-resolution image 34 is generated (step S36). This interpolating process can be occasionally omitted.

Thereafter, the correspondences of the displacement positions between the resolution enhancement target image and the other images are identified based on the image displacements recorded in the image displacement recording section 24 (step S38). The image displacements between the resolution enhancement target image and the other images are generated by integrating the displacement between the basic image in the image displacement estimating section 22 and the resolution enhancement target image with the displacements between the basic image in the image displacement estimating section 22 and the images other than the resolution enhancement target image, which are recorded in the image displacement recording section 24.

A point spread function (hereinafter, PSF) in which image acquisition properties such as an optical transfer function (OTF) and CCD aperture are taken into consideration is obtained (step S40). As the PSF, a Gaussian function is used in a simple manner.

Thereafter, an evaluation function f(z) is minimized based on the Information at steps S38 and S40 (step S42). f(z) satisfies the following relationship:

$$f(z) = \sum_k \|y_k - A_k z\|^2 + \lambda g(z) \quad (1)$$

where y represents shot images with a first resolution (low-resolution images 32) and shot images with a second resolution (high-resolution images 30) recorded in the image recording section 18; z represents a high-resolution image 34 of the resolution enhancement target image selected from the images with the first resolution (target image to be estimated); $A_k$ represents an image transformation matrix indicative of the image acquisition system including the image displacement, PSF, image mixing, etc; q(z) represents a constraint term or the like that accounts for smoothness and color correlation of images; and λ represents a weighting coefficient. For example, the steepest descent method is used for the minimization of the evaluation function.

A determination is made as to whether f(z) obtained at step S42 is minimized (step S44). When f(z) is minimized, the process is ended and a high-resolution image 34(z) of the target image is obtained. When f(z) is not yet minimized, the high-resolution image 34(z) is updated (step S46), and the process returns to step S42.

The above process is executed on all the low-resolution images 32 selected by the resolution enhancement image selecting section 26.

As one example of the process for generating the high-resolution image 34 using a plurality of images, an outline of the super-resolution process is described below with reference to FIG. 8 illustrating an example of the configuration of the resolution enhancing section 28. In the example of FIG. 8, the constraint term g(z) in the formula (1) is omitted. Actually, constraint conditions are integrated into a convolution integration section 28B. When the constraint condition g(z) in the formula (1) is omitted, a condition of z that minimizes f(z) is that:

$$\partial \frac{f(z)}{\partial z} = \sum A^T (Az - y_k) \quad (2)$$

is made to be zero. In fact, since an algorithm of iterative restoration is used, the following formula holds:

$$z_n = z_{n-1} + \Sigma A^T (A z_{n-1} - y_k) \quad (3)$$

FIG. 8 is a block diagram for calculating the formula (3) including an iterative convergence condition.

The resolution enhancing section 23 includes an interpolation enlarging section 28A, a convolution integration section 28B, a PSF data holding section 28C, an image comparing section 28D, a multiplying section 28E, a superposition adding section 28F, an accumulation adding section 28G, an updated image generating section 28H, an image accumulating section 28I, an iterative calculation determining section 28J, and an iterative determination value holding section 28K. In the calculation of the formula (3), a displacement amount per high-resolution grid is included in the reference image y, and a microscopic displacement amount less than the high-resolution grid is included in the system matrix A based on an image displacement estimation value obtained before. For this reason, a displacement amount data separating section 28L and a reference image transforming section 28M are provided.

The image acquisition section 12 supplies image data of any one of a plurality of frames as a basic image 44 to the interpolation enlarging section 28A, where interpolation enlargement is carried out. An example of an interpolation enlarging method includes bilinear interpolation and bicubic interpolation. The image data of the image which is interpolated to be enlarged is passed to the convolution integration section 28B, and is convolved with PSF data supplied by the PSF data holding section 28C. This process is for providing an initial value of the high-resolution image 34(z). Therefore, the part shown by (*) in the drawing is subjected to this process only once at the beginning of the process. Thereafter, the convolution integration calculation in the convolution integration section 28B is performed on the updated high-resolution image 34(z).

As described above, the image displacement estimation value previously obtained is separated into the displacement amount 46 per high-resolution grid and the microscopic displacement amount 48 less than the high-resolution grid in the displacement amount data separating section 28L. The displacement amount 46 per high-resolution grid is supplied to the reference image transforming section 28M, and the microscopic displacement amount 48 less than the high-resolution grid is supplied to the PSF data holding section 28C. When the high-resolution grid unit is set as 1 pixel, and for example, the image displacement estimation value is 1.3 pixel, 1.0 pixel is supplied to the reference image transforming section 28M and 0.3 pixel is supplied to the PSF data holding section 28C. The PSF data holding section 28C determines PSF data to be used according to the microscopic displacement amount 48 less than the high-resolution grid supplied from the displacement amount data separating section 28L. For example, the PSF data holding section 28C holds PSF data for each 0.1 pixel, and when the microscopic displacement amount 48 less than the high-resolution grid is supplied, the PSF data which is the closest to the microscopic displacement amount 48 may be determined as the data to be used. The PSF data determined in such a manner is used in the convolution integration section 28B and a transposing section 28N.

The reference image transforming section 28M performs coordinate conversion on a reference image 50 per grid of the high-resolution image 34 based on the displacement amount 46 per high-resolution grid in each frame supplied from the displacement amount data separating section 28L so as to generate a transformed image. The image data of the generated transformed image is transmitted to the image comparing section 28D.

The image data of the basic image 44 interpolated to be enlarged by the interpolation enlarging section 28A is supplied to the convolution integration section 28B and simultaneously sent also to the image accumulating section 28I so as to be accumulated. The image data of the image convoluted in the convolution integration section 28B is sent to the image comparing section 28D.

The image comparing section 28D performs a calculation corresponding to the above $(Az_n - y_k)$ based on the image data of the transformed image sent from the reference image transforming section 28M and the image data of the convoluted image sent from the convolution integration section 28B. Residuals of the images are sent to the multiplying section 28E, where the PSF data supplied by the PSF data holding section 28C is multiplied by the values for respective pixels of the transposed data $A^T$ transposed by the transposing section 28N. The calculated results $A^T(Az_n-y_k)$ are sent to the superposition adding section 28F, and are placed on corresponding coordinate positions. Since the coordinate positions of the image data from multiplying section 28E are shifted gradually with overlapping, overlapped portions are added. When the superposition addition of the image data for one shot image is ended, the resulting image data are sent to the accumulation adding section 28G. The accumulation adding section 28G accumulates data sequentially received until the process for the number of frames is ended, and sequentially adds the image data for respective frames while the estimated displacement amount is taken into consideration. The accumulated and added image data are sent to the updated image generating section 28H.

At the same time, the image data accumulated in the image accumulating section 28I are supplied to the updated image generating section 28H, and the two image data are weighted and added so that the updated image data is generated. The generated updated image data is supplied to the iterative calculation determining section 28J, where a determination is made as to whether the calculation is to be repeated based on an iterative determination value supplied from the iterative determination value holding section 28K. When the calculation is repeated, the updated image data is sent to the convolution integration section 28B, and a series of the above process is repeated. If the calculation is not to be repeated, the generated updated image data is output.

The image which is subject to the series of process and is output from the iterative calculation determining section 28J has a higher resolution than the low-resolution image 32 acquired at the time of shooting, namely, the image is the high-resolution image 34.

The PSF data holed in the PSF data holding section 28C is given by the point spread function PSF obtained by the image forming optical system 10 and the aperture shape of a light-receiving portion on the image sensor of the image acquisition section 12 or given by a value obtained by approximating the PSF. Since a calculation on a suitable coordinate position is necessary in the convolution integration, the microscopic displacement amount 48 less than the high-resolution grid for each frame is supplied from the displacement amount data separating section 28L.

Figure 9:
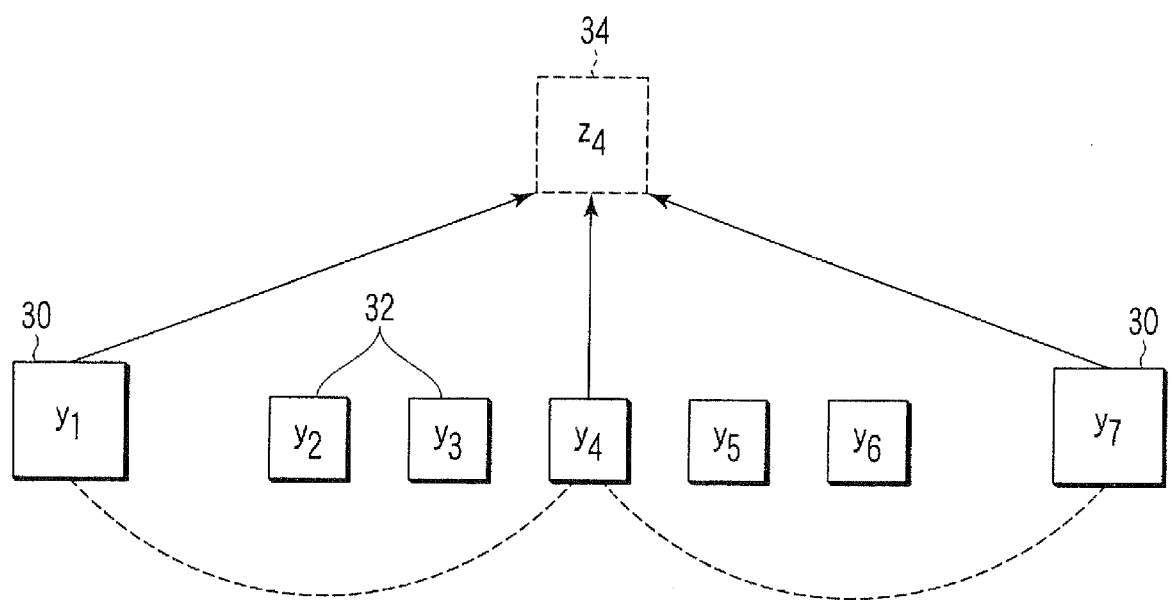
FIG. 9 is a conceptual diagram illustrating the super-resolution process using the estimation of a motion between images according to a modification example of the first embodiment of the present invention.

A modification example of the first embodiment is described below with reference to a conceptual diagram of FIG. 9.

The two kinds of image acquisition using the interrupting operation according to the present invention are the same as the examples shown in FIGS. 3 and 4.

The images acquired by shooting are recorded in the image recording section 18. The basic image selecting section 20 selects one from the images saved in the image recording section 18 as a basic image for estimating the image displacement. The low-resolution image 32 whose resolution is to be enhanced is selected as the basic image. The basic image for estimating the image displacement is identical to the target image whose resolution is to be enhanced. The high-resolution images 30 acquired by shooting after and before the basic image are selected as reference images. The image displacement estimating section 22 obtains displacement positions between the basic image selected by the basic image selecting section 20 and the high-resolution images 30 as the reference images as shown by broken lines in FIG. 9, so as to record the obtained results in the image displacement recording section 24.

Figure 5:
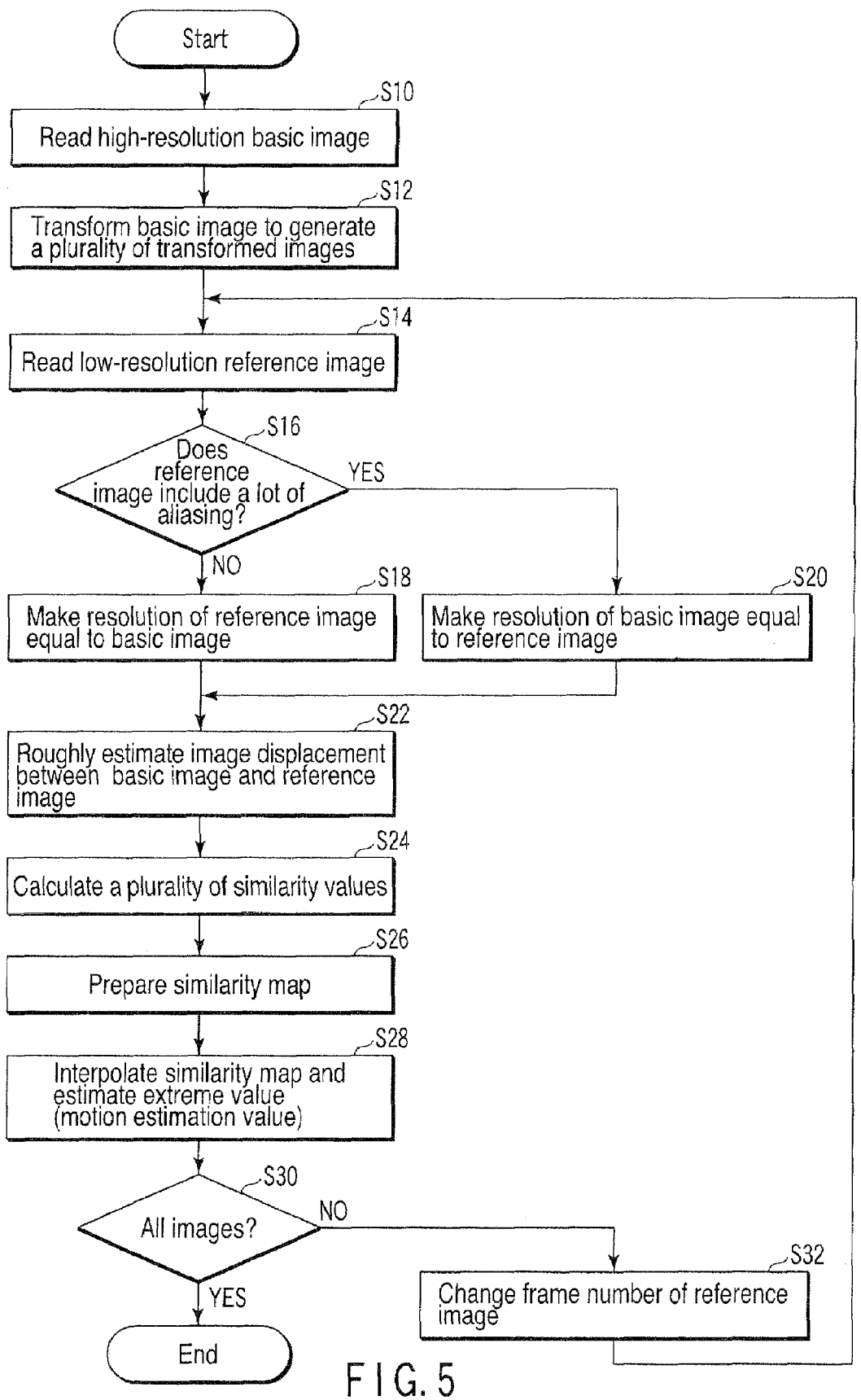
FIG. 5 is a flow chart illustrating a flow of a process for estimating displacements between images in the first embodiment.

The specifics of the algorithm of the image displacement estimation are the same as those in the embodiment in FIG. 5.

The image displacement estimation value obtained by the image displacement estimating section 22 is recorded in the image displacement recording section 24. The resolution enhancing section 28 executes the image resolution enhancing process on the resolution enhancement target image according to image transformation as shown by solid arrows in FIG. 9 based on the recorded image displacement information, the selection information about the resolution enhancement target image selected by the resolution enhancement image selecting section 26 and the high-resolution images recorded in the image recording section 18.

Figure 10:
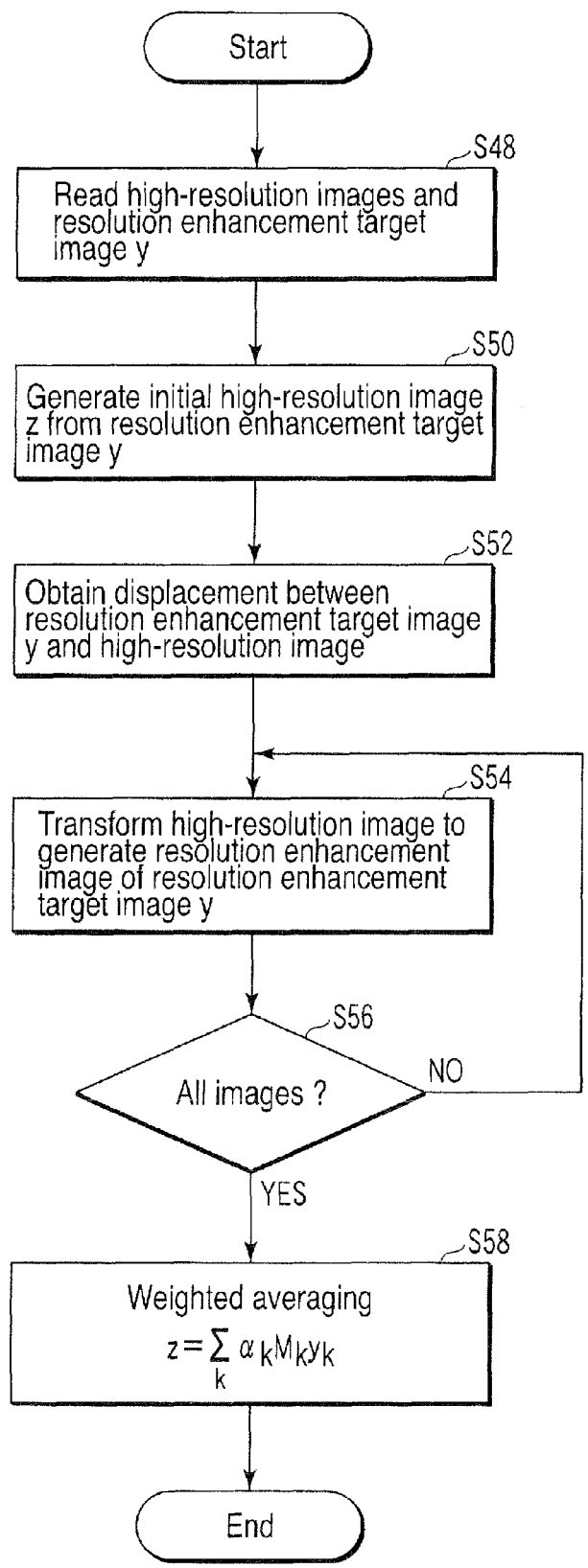
FIG. 10 is a flow chart illustrating a flow of an image resolution enhancing process according to a modification example of the first embodiment.

An example of the image resolution enhancing process according to the image transformation is described below along a flow chart of FIG. 10 illustrating the detailed flow of the image resolution enhancing process algorithm.

The high-resolution image(s) 30 (for example, $y_1$, $y_7$) and the low-resolution image 32 (for example, $y_4$) as the resolution enhancement target image acquired by the shooting in the image acquisition section 12 are read from the image recording section 18 so as to be used for generating a high-resolution image (step S48). The high-resolution image 30 is selected by the basic image selecting section 20, and the image displacement between the high-resolution image 30 and the low-resolution image 32 as the resolution enhancement target image $y_4$ is obtained by the image displacement estimating section 22. A plurality of the high-resolution images 30 may be read.

The interpolating process is executed on the resolution enhancement target image read at step S48 so that an initial high-resolution image is generated (step S50). This interpolating process can be occasionally omitted.

A corresponding position between the resolution enhancement target image $y_4$ and the high-resolution image 30 read at step S48 is identified based on the image displacement recorded in the image displacement recording section 24 (step S52). The high-resolution image 30 read at step S48 is the reference image of the image displacement estimating section 22, and the displacement position correspondence is recorded in the image displacement estimating section 22.

The high-resolution image 30 read at step S48 is transformed based on the correspondence information about the displacement position between the resolution enhancement target image $y_4$ and the high-resolution image 30 read at step S48, so that a resolution enhancement image of the resolution enhancement target image $y_4$ is generated (step S54). This process is executed on all the high-resolution images 30 read at step S48 (step S56).

All the resolution enhancement images generated at step S54 and the initial high-resolution image generated at step S50 are weighted-averaged, so that one high-resolution image 34 ($z_4$) of the resolution enhancement target image $y_4$ is generated (step S58). The following formula holds:

$$z = \sum_k \alpha_k M_k y_k \qquad (4)$$

where z represents the high-resolution image 34 acquired by enhancing the resolution of the resolution enhancement target image, $\alpha$ represents a weighting coefficient, y represents the high-resolution image 30 read at step S48 or the initial high-resolution image generated at step S50, and M represents a matrix including the information about the image displacement between the resolution enhancement target image and y.

In the first embodiment, when interruption is ended during shooting of images and the images are recorded in the image recoding section 18, the image displacement estimating process and the image resolution enhancing process are executed sequentially in the following manner: a basic image of the image displacement estimating process is selected so that the image displacement estimating process is executed, the image displacement is recorded in the image displacement recording section 24, and a resolution enhancement target image is selected so that the resolution enhancing process is executed. When the image displacement estimating section 22 carries out the image displacement estimation on a plurality of reference images, the image displacement can be recorded in the image displacement recording section 24 at the time when the estimation of one reference image is ended. For this reason, the image displacement estimating process and the resolution enhancing process may be executed in parallel.

When the resolution of an image is enhanced by using a plurality of images, an image to be used is not limited to the low-resolution image 32, unlike an existing super-resolution method, and both the low-resolution image 32 and the high-resolution image 30 are used. As a result, advantages of the low-resolution image 32 whose resolution is low but whose frame rate is high and the high-resolution image 30 whose resolution is high but whose frame rate is low are brought out, so that the high-resolution image 34 with a high frame rate whose disadvantage is compensated for is generated. This can be used in, for example, a case of enhancing a resolution of a moving image with a high frame rate using the moving image and a still image shot by an apparatus for both still images and moving images which shoots moving images using pixel mixed reading and during this shooting, shoots still images using maximum resolution of CCD, a case of suppressing noise using a pixel mixed image with less noise for the resolution enhancing process, and a case of converting any one of the shot moving images into an image with a resolution as high as the still images.

In the first embodiment of the present invention, images are related to each other, so that the images can be related to each other on a high-resolution image space where a pixel sampling rate is high. Adjacent images do not have to be related to each other, and instead, the high-resolution image 30 and any low-resolution image 32 are related to each other. Consequently, an accumulation error is not generated, unlike in a case of integrating the correspondences between adjacent images.

A second embodiment of the present invention is described below.

A configuration of the image acquisition apparatus according to the second embodiment is described with reference to FIG. 11. The same components as those in FIG. 1 are assigned the same reference numerals and the description thereof is not repeated, and only different features are mainly described.

Figure 11:
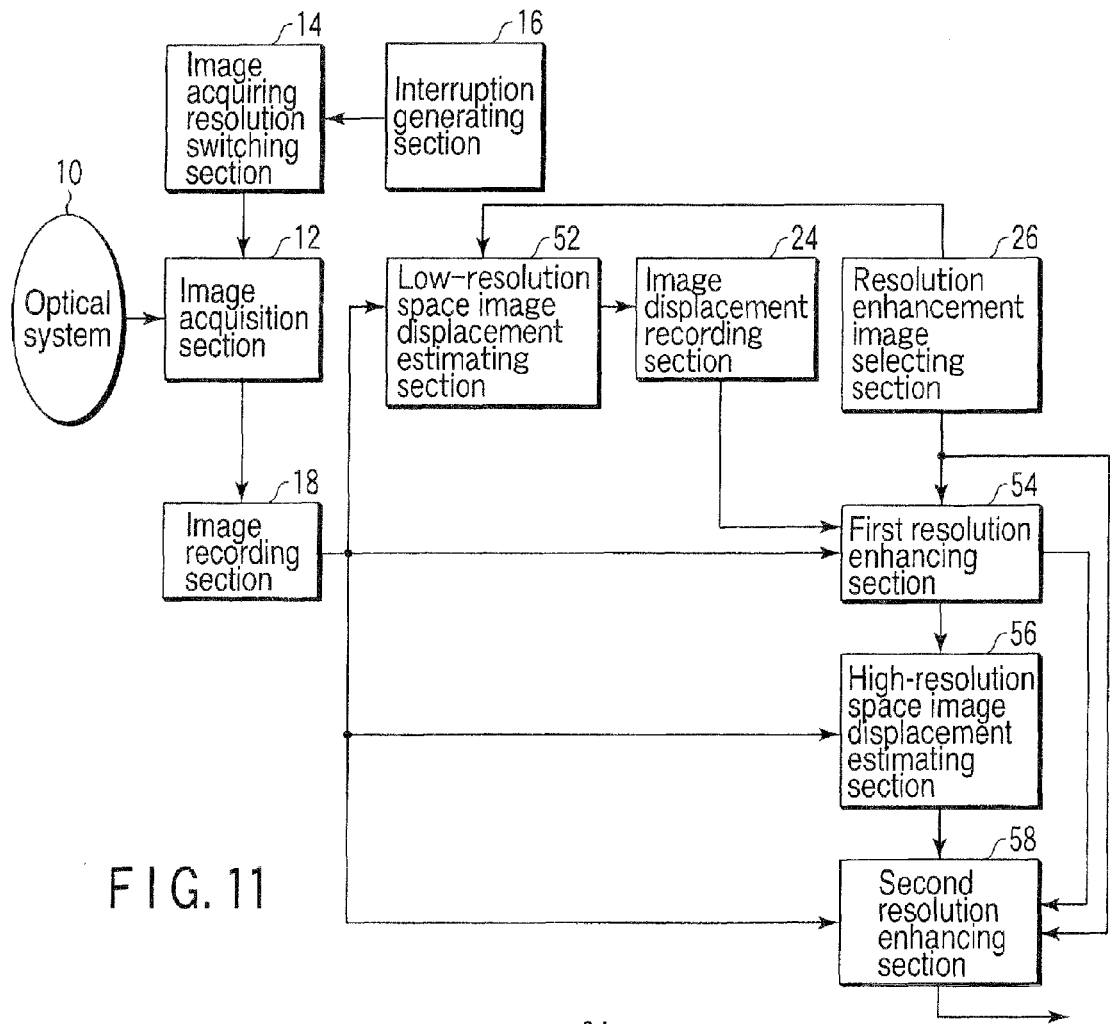
FIG. 11 is a block diagram illustrating a configuration of the image acquisition apparatus according to a second embodiment of the present invention.

In FIG. 11, the optical system 10 forms an optical image on the image acquisition section 12, where the formed image is spatially discretized, sampled, and converted into image data. The image data is electronically recorded in the image recording section 18. In this case, the resolution of an image acquired by shooting in the image acquisition section 12 is high when the image acquiring resolution switching section 14 is switched into the high-resolution mode so that the high-resolution image 30 is shot. When the image acquiring resolution switching section 14 is switched into the low-resolution mode, the low-resolution images 32 whose resolution is lower but frame rate is higher than the high-resolution image 30 are continuously shot.

In the second embodiment, when the resolution enhancement image selecting section 26 selects a basic image to be a basis for the image displacement estimation from the low-resolution images 32 recorded in the image recording section 18, a low-resolution space image displacement estimating section 52 estimates the displacements between the basic image and the low-resolution images 32 other than the basic image. The estimated image displacements are recorded in the image displacement recording section 24. A first resolution enhancing section 54 generates a resolution enhancement intermediate image using the image displacement recorded in the image displacements recording section 24, the low-resolution images 32 recorded in the image recording section 18, and the resolution enhancement image selection information representing the target image for resolution enhancement which is selected by the resolution enhancement image selecting section 26.

A high-resolution space image displacement estimating section 56 estimates the displacement between images using the resolution enhancement intermediate image generated by the first resolution enhancing section 54 and the high-resolution image recorded in the image recording section 18, the resolution enhancement intermediate image being used as the basic image. A second resolution enhancing section 58 enhances the resolution of the resolution enhancement intermediate image using the displacement between images estimated by the high-resolution space image displacement estimating section 56, the resolution enhancement image selection information selected by the resolution enhancement image selecting section 26, and the high-resolution image estimated by the first resolution enhancing section 54, so as to generate and output the high-resolution image 34.

In the second embodiment, the low-resolution space image displacement estimating section 52, which functions as first displacement estimating unit, and the high-resolution space image displacement estimating section 56, which functions as second displacement estimating unit, are provided for an image quality enhancing process.

The resolution enhancement image selecting section 26 functions as a unit configured to select one of output images having a first resolution as the basic image from a plurality of output images having at least two kinds of different resolutions at least including the output images having a first resolution and output images having a second resolution higher than the first resolution. The low-resolution space image displacement estimating section 52 corresponds to a first displacement estimating unit, the first resolution enhancing section 54 corresponds to a high-resolution image estimating unit, the high-resolution space image displacement estimating section 56 corresponds to a second displacement estimating unit, and the second resolution enhancing section 58 corresponds to a resolution converting unit.

Figure 12:
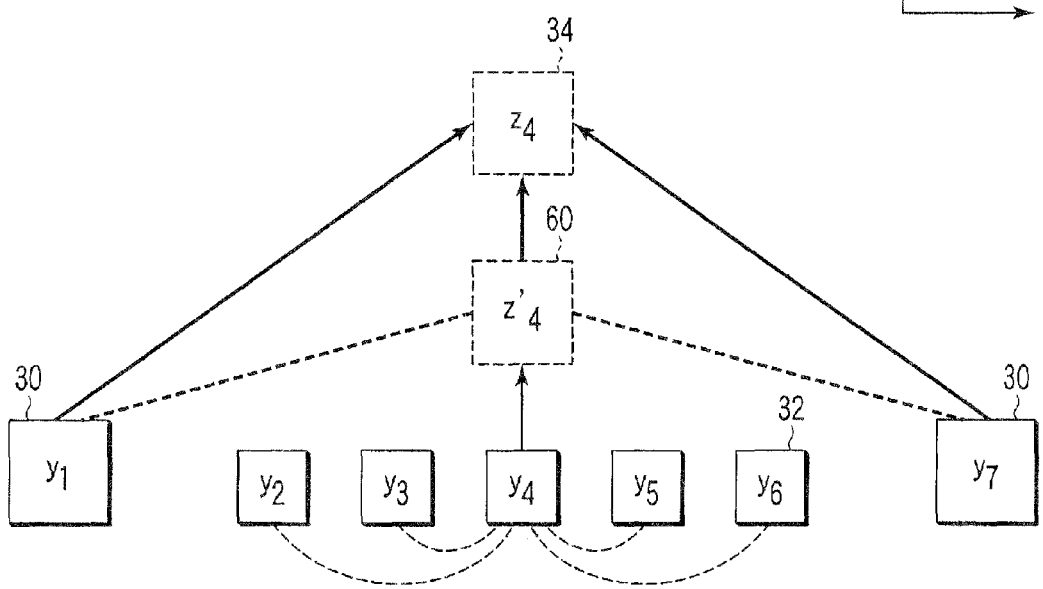
FIG. 12 is a conceptual diagram illustrating a process according to the second embodiment.

FIG. 12 illustrates a concept of a process according to the second embodiment. That is, a high-resolution image $z'_4$ corresponding to a target image $y_4$ is calculated from the low-resolution image string $y_2$ to $y_6$ as shown by a thin solid line arrow in FIG. 12 by using image motion estimation in the low-resolution space shown by thin broken lines in FIG. 12. The high-resolution image $z'_4$ corresponds to the resolution enhancement intermediate image 60. Further, as shown by thick broken lines in FIG. 12, the displacements between images are estimated by using the resolution enhancement intermediate image 60 ($z'_4$) and the high-resolution images 30 ($y_1, y_7$). In this case, the resolution enhancement intermediate image 60 ($z'_4$) is an image which is defined by a grid whose resolution is higher than the low-resolution images 32 ($y_2$ to $y_6$), and has more edge information than an image obtained by interpolating an original image. Therefore, when the displacements between the resolution enhancement intermediate image 60 ($z'_4$) and images such as the high-resolution images 30 ($y_1$, $y_7$) having a high resolution are estimated, the displacement amounts can be estimated more accurately than the method for directly obtaining the displacements between the target low-resolution image 32 ($y_4$) and the high-resolution images 30 ($y_1$, $y_7$). As shown by thick arrows in FIG. 12, the high-resolution image 34 ($z_4$) corresponding to the target image $y_4$ is calculated based on the resolution enhancement intermediate image 60 ($z'_4$) and the high-resolution images 30 ($y_1$, $y_7$) by using such an accurate displacement amounts.

The operation of the image acquisition apparatus according to the second embodiment shown in FIG. 11 is described below with reference to FIG. 12 as a conceptual diagram of the second embodiment.

An example of the image shooting using two interrupting operations according to the present invention is described below.

In FIG. 11, in the first example of the interrupting operation as shown in FIG. 3, the image acquiring resolution switching section 14 is switched into the low-resolution mode in a normal state, and at the time of shooting, allows the image acquisition section 12 to continuously output the low-resolution images 32 by continuous shooting. When the interruption generating section 16 generates interruption according to a user pressing the switch 36 or the like during the continuous shooting, the image acquiring resolution switching section 14 is switched into the high-resolution mode and allows the image acquisition section 12 to output the high-resolution image 30. Thereafter, the image acquiring resolution switching section 14 is again switched into the low-resolution mode and allows the image acquisition section 12 to continuously output the low-resolution images 32.

In the second example of the interrupting operation, the image acquiring resolution switching section 14 is switched into the low-resolution mode at the time of shooting so as to allow the image acquisition section 12 to continuously output the low-resolution images 32, and during the continuous output, the interruption generating section 16 iteratively generates an interruption, as shown in FIG. 4. When this iterative interruption is generated, the image acquiring resolution switching section 14 is switched into the high-resolution mode and allows the image acquisition section 12 to output the high-resolution image 30. That is, the high-resolution image 30 is acquired in a constant cycle.

As the above-described first and second examples, the low-resolution images 32 and the high-resolution images 30 acquired by the shooting in the image acquisition section 12 are recorded in the image recording section 18. The resolution enhancement image selecting section 26 selects one of the images saved in the image recording section 18 as the basic image for estimating the image displacement. In the second embodiment, a low-resolution image 32 is selected as the basic image. The low-resolution space image displacement estimating section 52 obtains the displacement positions between the basic image selected by the resolution enhancement image selecting section 26 and the intended low-resolution images 32 other than the target basic image so as to record the obtained results in the image displacement recording section 24.

Details of the flow of the image displacement estimation algorithm in the low-resolution space image displacement estimating section 52 are given with reference to a flow chart of FIG. 13.

One of the low-resolution images 32 to be the basis for the image displacement estimation is read as the basic image (step S60). The read basic image is transformed with a plurality of image displacements so that an image string is generated (step S62).

Thereafter, one low-resolution image 32 for estimating the image displacement with respect to the basic image is read as the reference image (step S64). Then, displacement between the basic image and the reference image is roughly estimated (step S66). Details of the rough image displacement estimation are similar to the method in the first embodiment. Thereafter, similarity values between the image string obtained by transforming the basic image to generate a plurality of transformed images at step S62 and the reference image are calculated (step S68). A discrete similarity map is prepared by using relationships between parameters of the image displacement and the calculated similarity values (step S70). Thereafter, an extreme value of the continuous similarity values obtained by interpolating the discrete similarity map prepared at step S70 is searched for so as to be obtained (step S72). The image displacement having the extreme value is the image displacement to be obtained. The method for searching for the extreme value of the similarity map includes a parabola fitting method, a spline interpolating method and the like. FIG. 7 illustrates the example where the image displacement is estimated by parabola fitting. An ordinate axis represents the similarity, and the smaller the value, the higher the similarity. The obtained image displacement is recorded in the image displacement recording section 24.

A determination is made as to whether the image displacement estimation is performed on all the intended reference images (step S74). When the estimation is not ended, the frame number of the reference images is changed (step S76), and the process returns to step S64 so that the process for reading the next image is continued. When the image displacement estimation is performed on all the intended reference images, the process is ended.

The first resolution enhancing section 54 enhances the resolution using the displacements between images recorded in the image displacement recording section 24, the selection information about the image whose resolution should be enhanced, which is selected by the resolution enhancement image selecting section 26, and the string of the low-resolution images 32 recorded in the image recording section 28 so as to generate the resolution enhancement intermediate image 60. The resolution enhancement intermediate image 60 corresponds to an image having a third resolution higher than the first resolution, of the low-resolution image 32. Needless to say, the third resolution may be the same as or higher than the second resolution of the high-resolution image 30, or may be higher than the first resolution and lower than the second resolution. In the method for enhancing the resolution in the first resolution enhancing section 54, the interpolation process and the motion correction process may be executed on images into a high-resolution image space using the displacements between images and the low-resolution image 32, and a process for averaging all the images where motions are corrected may be executed. In another manner, the resolution enhancing method described in the first embodiment shown in FIGS. 7 and 8 may be used.

Figure 14:
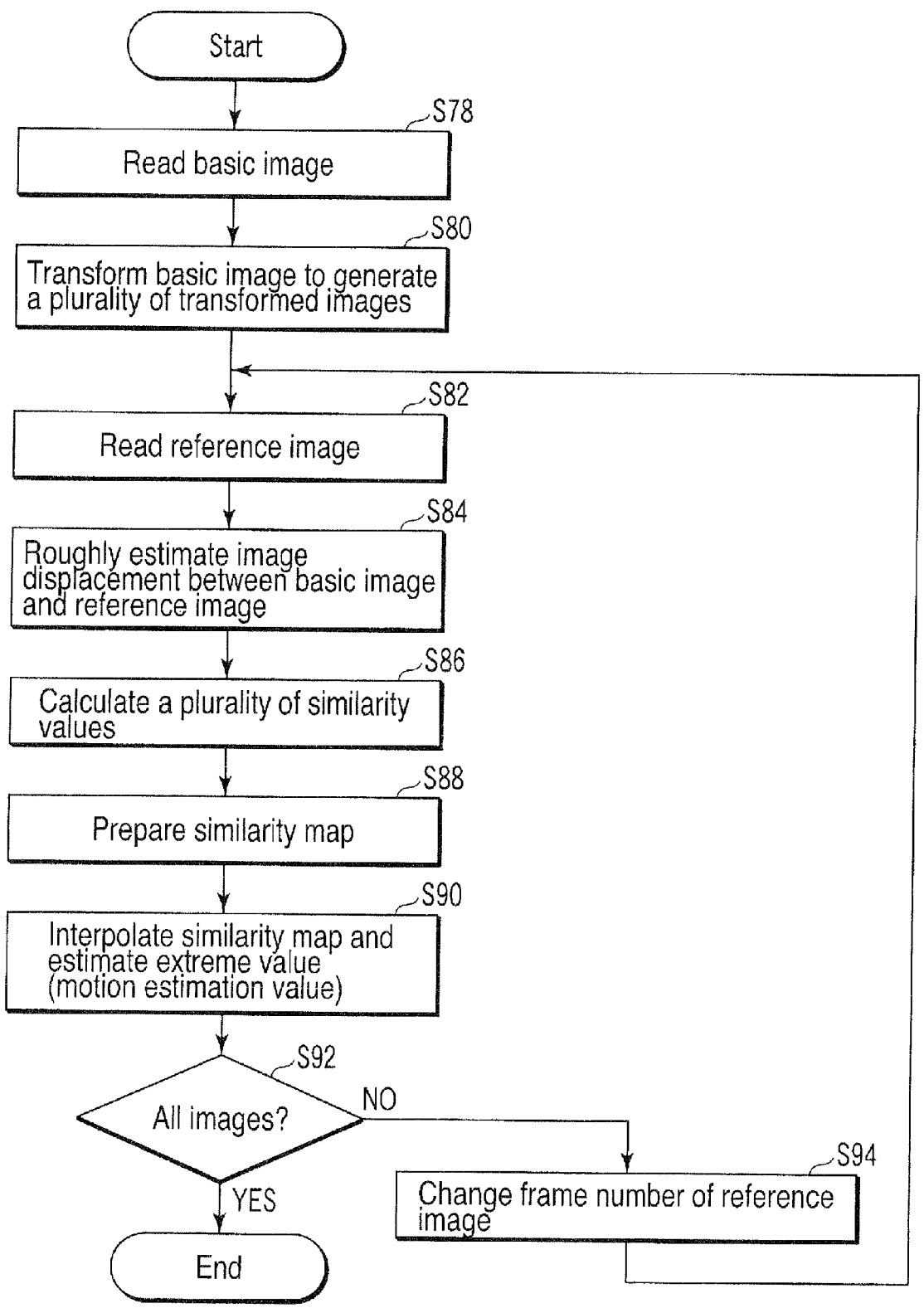
FIG. 14 is a flow chart illustrating a flow of the image displacement estimating process in a high-resolution space image displacement estimating section.

The high-resolution space image displacement estimating section 56 estimates the displacements between the resolution enhancement intermediate image 60 and the high-resolution images 30 recorded in the image recording section 18 using the resolution enhancement intermediate image 60 whose resolution is enhanced by the first resolution enhancing section 54, the selection information about the image whose resolution should be enhanced, which is selected by the resolution enhancement image selecting section 26, and the string of the high-resolution images 30 recorded in the image recording section 18. Details of the high-resolution space image displacement estimating section 56 are similar to those of the low-resolution space image displacement estimating section 52 except that a resolution space where the section 52 performs estimation has high resolution. A flowchart of the algorithm in the high-resolution space image displacement estimating section 56, as shown in FIG. 14, is basically the same as that in the low-resolution space image displacement estimating section 52. The differences only lie in that the basic image is the resolution enhancement intermediate image 60 whose resolution is enhanced by the first resolution enhancing section 54 instead of the low-resolution image 32, and that the reference image is the high-resolution image 30 instead of the low-resolution image 32.

That is, one high-resolution image 30 to be the basis for the image displacement estimation is read as the basic image (step S78). The read basic image is transformed with a plurality of image displacements so that an image string is generated (step S80).

Thereafter, one high-resolution image 30 whose image displacement with respect to the basic image is estimated is read as the reference image (step S82). The displacement between the basic image and the reference image is roughly estimated (step S84). The specifics of the method for roughly estimating the image displacement are similar to the method in the first embodiment. Thereafter, the similarity values between the image string acquired by transforming the basic image to generate a plurality of transformed images at step S80 and the reference image are calculated (step S86). A discrete similarity map is prepared by using the relationships between the parameters of the image displacement and the calculated similarity values (step S88). Thereafter, an extreme value of the continuous similarity values obtained by interpolating the discrete similarity map prepared at step S88 is searched for so as to be obtained (step S90). The image displacement having the extreme value is the image displacement to be obtained. The method for searching for the extreme value of the similarity map includes the parabola fitting method, the spline interpolation method and the like.

A determination is made as to whether the image displacement estimation is made on all the intended reference images (step S92). When the estimation is not ended, the frame number of the reference images is changed (step S94) and the process returns to step S82 so that the process for reading the next image is continued. When the image displacement estimation is made on all the intended reference images, the process is ended.

The second resolution enhancing section 58 generates and outputs the high-resolution image 34 using the resolution enhancement intermediate image 60 whose resolution is enhanced by the first resolution enhancing section 54, the selection information about the image whose resolution should be enhanced which is selected by the resolution enhancement image selecting section 26, the string of the high-resolution images 30 recorded in the image recording section 18 and the displacements between images estimated by the high-resolution space image displacement estimating section 56.

Figure 15:
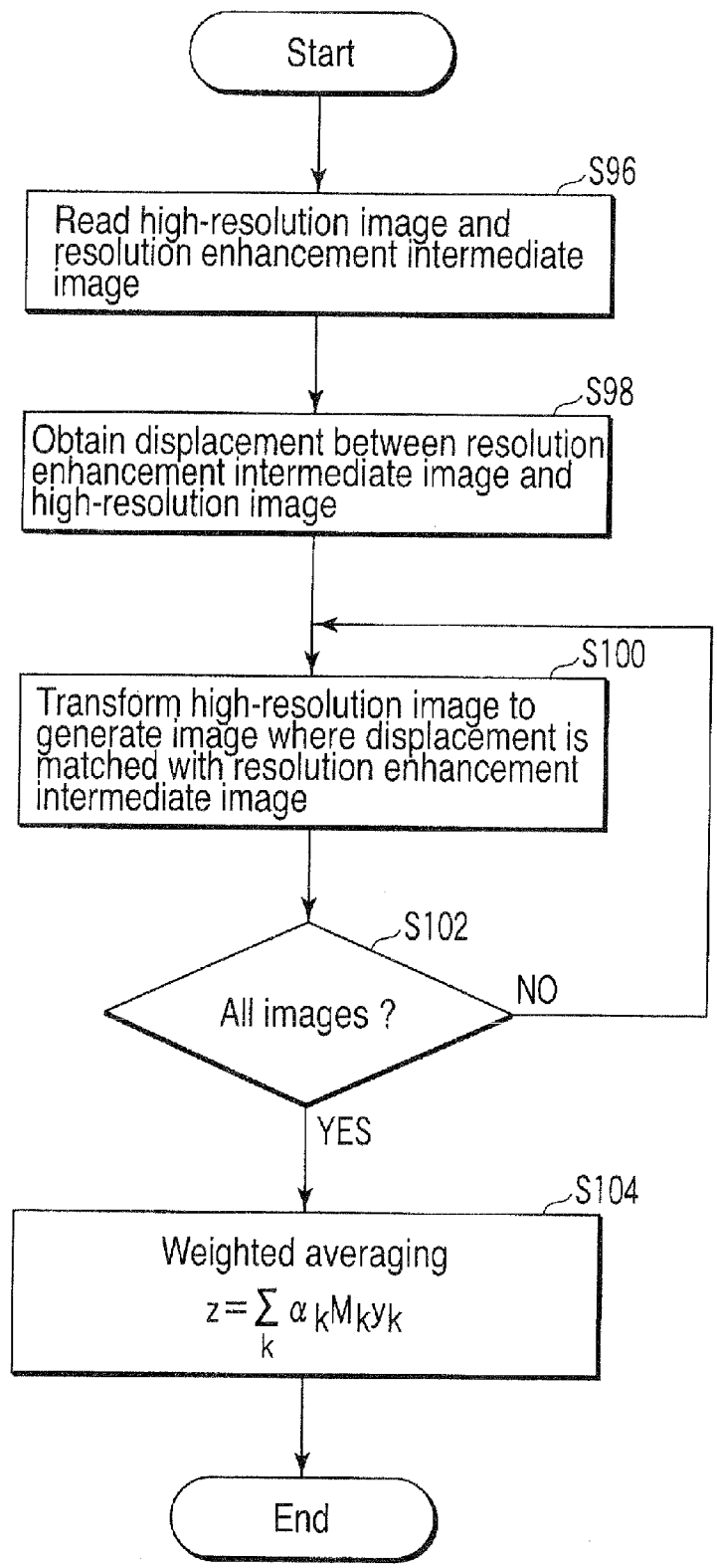
FIG. 15 is a flow chart illustrating a detailed flow of an image resolution enhancing process algorithm in a second resolution enhancing section.

An example of the image resolution enhancing process in the second resolution enhancing section 58 is describe below with reference to a flow chart illustrating a detailed flow of the resolution enhancing process algorithm in FIG. 15.

The high-resolution image 30 which is acquired by shooting in the image acquisition section 12 and the resolution enhancement intermediate image 60 are read from the image recording section 18 and the first resolution enhancing section 54, respectively, so as to be used for generating a high-resolution image (step S96). A plurality of the high-resolution images 30 may be read.

The corresponding position between the resolution enhancement intermediate image 60 and the high-resolution image 30 read at step S96 is identified by the displacement between images estimated by the high-resolution space image displacement estimating section 56 (step S98).

The high-resolution image read at step S96 is transformed so that the displacement position is matched with the resolution enhancement intermediate image 60 read at step S78 based on the corresponding position between images to generate a transformed image (step S100).

This process is executed on all the high-resolution images 30 read at step S96 (step S102), and the resolution enhancement intermediate image 60 read at step S96 and all the transformed images generated at step S100 are weighted and added, so that one high-resolution image 34 corresponding to the resolution enhancement target image is generated (step S104). The following formula holds:

$$z = \sum_k \alpha_k M_k y_k \tag{5}$$

where z represents the high-resolution image 34 obtained by enhancing the resolution of the resolution enhancement target image, α represents a weighting coefficient, y represents the resolution enhancement intermediate image 60 read at step S396 or the image generated by transformation at step S100, and M represents a matrix including the information about the displacement between the resolution enhancement intermediate image 60 and y. As the resolution enhancing method executed in the second resolution enhancing section 58, the weighted addition process like the formula (5) may be used, but the resolution enhancing method described in the first embodiment shown in FIGS. 7 and 8 may also be used.

The image displacement estimating process and the image resolution enhancing process are sequentially executed in the following manner: when interruption during image shooting is ended and the images are recorded in the image recording section 18, a basic image of the image displacement estimating process is selected so that the image displacement estimating process is executed, the image displacement is recorded in the image displacement recording section 24, and a resolution enhancement target image is selected so that the resolution enhancing process is executed. When the low-resolution space image displacement estimating section 52 performs estimation of the displacements between images on a plurality of reference images, the image displacement can be recorded in the image displacement recording section 24 at the time when estimation of one reference image is finished, and thus the image displacement estimating process and the image resolution enhancing process may be executed in parallel.

In the second embodiment, similarly to the first embodiment, when the resolution of an image is enhanced by using a plurality of images, the images to be used are not limited to the low-resolution images 32 unlike the existing super-resolution method, and instead, both the low-resolution image 32 and the high-resolution image 30 are used. As a result, the advantages of the low-resolution image whose resolution is low but frame rate is high and the high-resolution image 30 whose resolution is high but frame rate is low are utilized, so that the high-resolution image 34 with a high frame rate where disadvantages are covered can be generated. This can be used in cases where the resolution of a moving image with high frame rate is enhanced, where the resolution of any one moving image is converted into a high resolution equivalent to the still image, where, when a photo opportunity comes during the shooting of the moving images, an image is shot (pre-captured) with the enhanced resolution of the image before release of a shutter, by using moving images and still images shot by an apparatus for both still images and moving images which shoots moving images using pixel mixed reading, and shoots still images using the CCD maximum resolution between the shooting of the moving images.

Particularly, in this embodiment, since the image displacement is estimated in the image displacement estimating process by using only the low-resolution images 32, the interrupting mode is effective for pre-capturing at the time of a mode for capturing the high-resolution image 32 when the interruption shutter is released.

The present invention is described based on the above-described embodiments, but the present invention is not limited to the embodiments, and obviously various modifications and applications can be made within the scope of the present invention.

For example, software programs which realize the functions of the above embodiments can be supplied to a computer, and the computer may run the programs so that the above functions can be realized. That is, the high-resolution image 30 and the low-resolution image 32 recorded in the image recording section 18 can be supplied to a computer outside the image acquisition apparatus, so that the high-resolution image 34 can be generated on the computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image acquisition apparatus which electronically records an image of a subject, comprising:
    an image sensor configured to shoot images with resolutions of the images being switched;
    a resolution switching unit configured to switch the resolutions of the images to be output from the image sensor;
    an image selecting unit configured to select a basic image from a plurality of output images which are output from the image sensor, wherein the plurality of output images have different resolutions of at least two types switched by the resolution switching unit, and include at least an image having a first resolution and an image having a second resolution higher than the first resolution;
    an image displacement estimating unit configured to estimate a displacement between the basic image and another image; and
    a resolution converting unit configured to convert the resolution of any image in the plurality of output images output from the image sensor using the image having the first resolution and the image having the second resolution shot by the image sensor and the displacement between images obtained by the image displacement estimating unit.

2. The image acquisition apparatus according to claim 1, wherein the image displacement estimating unit estimates the displacement between images based on the image having the first resolution and the image having the second resolution.

3. The image acquisition apparatus according to claim 1, wherein the image displacement estimating unit estimates an image having a third resolution higher than the first resolution based on the image having the first resolution, and estimates the displacement between images based on the image having the second resolution and the estimated image having the third resolution.

4. The image acquisition apparatus according to claim 3, wherein:
    the image selecting unit selects one of a plurality of images having the first resolution as the basic image,
    the image displacement estimating unit includes:
        a first displacement estimating unit configured to estimate a displacement between the selected basic image and another image having the first resolution;
        a high-resolution image estimating unit configured to estimate the image having the third resolution higher than the first resolution using a calculated result in the first displacement estimating unit; and
        a second displacement estimating unit configured to estimate a displacement between the image having the third resolution obtained by the high-resolution image estimating unit and the image having the second resolution, and
    the resolution converting unit converts a resolution of any image in the plurality of output images output from the image sensor using the displacement between images obtained by the second displacement estimating unit.

5. The image acquisition apparatus according to claim 1, wherein the resolution converting unit converts an image having the first resolution output from the image sensor into an image having the second resolution higher than the first resolution.

6. The image acquisition apparatus according to claim 1, wherein the image sensor reads images having the first resolution at a higher reading rate than a reading rate for images having the second resolution.

7. The image acquisition apparatus according to claim 1, further comprising:
    an interruption signal generating unit configured to generate an interruption signal,
    wherein the resolution switching unit controls the image sensor to output an image having the second resolution in accordance with the interruption signal generated by the interruption signal generating unit.

8. The image acquisition apparatus according to claim 7, wherein after the resolution switching unit controls the image sensor to output the image having the second resolution, the resolution switching unit switches the resolutions of the output images output from the image sensor to the first resolution.

9. The image acquisition apparatus according to claim 7, wherein the interruption signal generating unit iteratively outputs the interruption signal in a predetermined cycle.

10. The image acquisition apparatus according to claim 7, wherein the resolution switching unit, the image selecting unit, the displacement estimating unit and the resolution converting unit are sequentially operated according to the interruption signal generated from the interruption signal generating unit.

11. An image acquisition apparatus which electronically records an image of a subject, comprising:
    an image sensor configured to shoot images with resolutions of the images being switched;
    a resolution switching unit configured to switch the resolutions of the images to be output from the image sensor;

an image selecting unit configured to select one of images having a first resolution as a basic image from a plurality of output images which are output from the image sensor, wherein the plurality of output images have different resolutions of at least two types switched by the resolution switching unit, and include at least images having the first resolution and an image having a second resolution higher than the first resolution;

a first displacement estimating unit configured to estimate a displacement between the basic image and another image having the first resolution;

a high-resolution image estimating unit configured to estimate an image having a third resolution higher than the first resolution using a calculated result in the first displacement estimating unit;

a second displacement estimating unit configured to estimate a displacement between the image having the third resolution obtained by the high-resolution image estimating unit and the image having the second resolution; and a resolution converting unit configured to convert a resolution of the image having the third resolution using the displacement between images obtained by the second displacement estimating unit.

12. The image acquisition apparatus according to claim 11, wherein the image sensor reads the images having the first resolution at a higher reading rate than a reading rate for images having the second resolution.

13. The image acquisition apparatus according to claim 11, further comprising:

an interruption signal generating unit configured to generate an interruption signal, wherein the resolution switching unit controls the image sensor to output an image having the second resolution in accordance with the interruption signal generated by the interruption signal generating unit.

14. The image acquisition apparatus according to claim 13, wherein after the resolution switching unit controls the image sensor to output the image having the second resolution, the resolution switching unit switches the resolutions of the output images output from the image sensor to the first resolution.

15. The image acquisition apparatus according to claim 13, wherein the interruption signal generating unit iteratively outputs the interruption signal in a predetermined cycle.

16. The image acquisition apparatus according to claim 13, wherein the resolution switching unit, the image selecting unit, the displacement estimating unit and the resolution converting unit are sequentially operated according to the interruption signal generated from the interruption signal generating unit.

17. A resolution enhancing method for enhancing a resolution of any image in a plurality of output images output from an image sensor in an image acquisition apparatus which acquires a plurality of images with at least two types of different resolutions from the image sensor which can shoot the output images with resolutions being switched, the method comprising:

acquiring, from the image sensor, the plurality of output images with at least two types of different resolutions, the plurality of output images including at least an image having a first resolution and an image having a second resolution higher than the first resolution;

selecting a basic image from the plurality of output images with at least two types of different resolutions acquired from the image sensor;

estimating a displacement between the basic image and another image; and converting a resolution of any image in the plurality of output images output from the image sensor using the image having the first resolution and the image having the second resolution output from the image sensor and the estimated image displacement.

18. A resolution enhancing method for enhancing a resolution of any image in a plurality of output images output from an image sensor in an image acquisition apparatus which acquires a plurality of images with at least two types of different resolutions from the image sensor which can shoot the output images with resolutions being switched, the method comprising:

acquiring, from the image sensor, the plurality of output images with at least two types of different resolutions, the plurality of output images including at least an image having a first resolution and an image having a second resolution higher than the first resolution, selecting one of the images having the first resolution as a basic image from the plurality of output images with at least two types of different resolutions acquired from the image sensor;

estimating a displacement between the basic image and another image having the first resolution;

estimating an image having a third resolution higher than the first resolution using the displacement between the basic image and the another image having the first resolution;

estimating a displacement between the image having the second resolution and the image having the third resolution; and converting a resolution of the image having the third resolution using the image having the second resolution and the displacement between the image having the second resolution and the image having the third resolution.

19. A resolution enhancing method for enhancing a resolution of any image in a plurality of output images output from an image sensor in an image acquisition apparatus which acquires a plurality of output images with at least two types of different resolutions from the image sensor which can shoot the output images with resolutions being switched, the method comprising:

acquiring an image having a first resolution from the image sensor;

generating an interruption signal;

switching the resolutions of the output images output from the image sensor in accordance with the generated interruption signal;

acquiring images each having a resolution higher than the first resolution from the image sensor in a manner corresponding with the switching;

selecting a basic image from the acquired images each having a resolution higher than the first resolution;

estimating a displacement between the basic image and another image having the first resolution; and converting a resolution of any image in the plurality of output images using the plurality of output images output from the image sensor and the displacement between the basic image and the another image having the first resolution.

20. A non-transitory computer readable recording medium having a resolution enhancing program stored thereon for generating a high-resolution image of any image in a plurality of output images having at least two types of different resolutions acquired by an image sensor which can shoot output images with resolutions being switched, the resolution enhancing program controlling a computer to execute functions comprising:

selecting a basic image from the plurality of output images having at least two types of different resolutions including at least an image having a first resolution and an image having a second resolution higher than the first resolution;

estimating a displacement between the basic image and another image; and converting a resolution of any image in the plurality of output images using the image having the second resolution and the estimated displacement between images.

21. A non-transitory computer readable recording medium having a resolution enhancing program stored thereon for generating a high-resolution image of any image in a plurality of output images having at least two types of different resolutions acquired by an image sensor which can shoot output images with resolutions being switched, the resolution enhancing program controlling a computer to execute functions comprising:

selecting one of images having a first resolution as a basic image from the plurality of images having at least two types of different resolutions including at least images having the first resolution and an image having a second resolution higher than the first resolution;

estimating a displacement between the basic image and another image having the first resolution;

estimating an image having a third resolution higher than the first resolution using the displacement between the basic image and the another image having the first resolution;

estimating a displacement between the image having the second resolution and the image having the third resolution; and converting a resolution of the image having the third resolution using the image having the second resolution and the displacement between the image having the second resolution and the image having the third resolution.

22. A non-transitory computer readable recording medium having a resolution enhancing program stored thereon for generating a high-resolution image of any image in a plurality of output images having at least two types of different resolutions acquired by an image sensor which can shoot output images with resolutions being switched, the resolution enhancing program controlling a computer to execute functions comprising:

acquiring an image having a first resolution from the image sensor;

generating an interruption signal;

switching the resolutions of the output images output from the image sensor in accordance with the generated interruption signal;

acquiring an image having a resolution higher than the first resolution from the image sensor in a manner corresponding with the switching;

selecting a basic image from the acquired images having a resolution higher than the first resolution;

estimating a displacement between the basic image and another image having the first resolution; and converting a resolution of any image in the plurality of output images acquired from the image sensor using the plurality of output images output from the image sensor and the displacement between the basic image and the another image having the first resolution.

* * * * *